(12) United States Patent
Yamagishi et al.

(10) Patent No.: US 12,552,670 B2
(45) Date of Patent: *Feb. 17, 2026

(54) CARBON FILM

(71) Applicant: ZEON CORPORATION, Tokyo (JP)

(72) Inventors: Tomoko Yamagishi, Tokyo (JP); Mitsugu Uejima, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 477 days.

This patent is subject to a terminal disclaimer.

(21) Appl. No.: 18/253,390

(22) PCT Filed: Nov. 30, 2021

(86) PCT No.: PCT/JP2021/043972
§ 371 (c)(1),
(2) Date: May 18, 2023

(87) PCT Pub. No.: WO2022/114235
PCT Pub. Date: Jun. 2, 2022

(65) Prior Publication Data
US 2023/0416094 A1 Dec. 28, 2023

(30) Foreign Application Priority Data
Nov. 30, 2020 (JP) ................... 2020-199176

(51) Int. Cl.
C01B 32/16 (2017.01)
G01N 15/08 (2006.01)

(52) U.S. Cl.
CPC ......... *C01B 32/16* (2017.08); *G01N 15/0886* (2013.01); *C01P 2002/82* (2013.01); *C01P 2004/13* (2013.01); *C01P 2006/17* (2013.01)

(58) Field of Classification Search
None
See application file for complete search history.

(56) References Cited

U.S. PATENT DOCUMENTS 7,854,991 B2 * 12/2010 Hata ............... B82Y 30/00
423/445 B
10,207,929 B2 * 2/2019 Yamagishi ........... H01B 5/02
(Continued)

FOREIGN PATENT DOCUMENTS

EP 2636642 A1 9/2013
JP 2018145027 A 9/2018
(Continued)

OTHER PUBLICATIONS

May 30, 2023, International Preliminary Report on Patentability issued in the International Patent Application No. PCT/JP2021/043972.
(Continued)

*Primary Examiner* — John J Figueroa
(74) *Attorney, Agent, or Firm* — KENJA IP LAW PC

(57) ABSTRACT

A carbon film is formed from carbon nanotube assemblies. In the carbon film, a pore distribution curve indicating the relationship between the pore size and the Log differential pore capacity obtained based on mercury intrusion porosimetry has at least one peak with a log differential pore capacity of 1.0 cm$^3$/g or more within a pore size range of 10 nm or more and 100 μm or less.

5 Claims, 10 Drawing Sheets

(56) References Cited

U.S. PATENT DOCUMENTS

| | | | | |
|---|---|---|---|---|
| 12,065,356 B2* | 8/2024 | Yamagishi | ............ | H05K 9/009 |
| 2014/0127586 A1* | 5/2014 | Kamizono | ............ | B82Y 40/00 |
| | | | | 428/221 |
| 2018/0065854 A1* | 3/2018 | Yamagishi | ............... | H01B 1/04 |
| 2023/0080840 A1 | 3/2023 | Yamagishi et al. | | |

FOREIGN PATENT DOCUMENTS

| | | | |
|---|---|---|---|
| JP | 2020047764 A | 3/2020 |
| WO | 2006011655 A1 | 2/2006 |
| WO | 2021172141 A1 | 9/2021 |

OTHER PUBLICATIONS

Nov. 14, 2024, the Extended European Search Report issued by the European Patent Office in the corresponding European Patent Application No. 21898206.4.

Feb. 22, 2022, International Search Report issued in the International Patent Application No. PCT/JP2021/043972.

Takahiro Morimoto et al, Length-Dependent Plasmon Resonance in Single-Walled Carbon Nanotubes, ACS NANO, 2014, pp. 9897-9904, vol. 8, No. 10.

* cited by examiner

SEM image

Two-dimensional spatial frequency spectrum

SEM image

Two-dimensional spatial frequency spectrum 2.5 µm$^{-1}$

CARBON FILM

TECHNICAL FIELD

This disclosure relates to a carbon film.

BACKGROUND

In recent years, carbon nanotubes (hereinafter, also referred to as "CNTs") have been attracting attention as materials having excellent electrical conductivity, thermal conductivity, and mechanical characteristics. However, CNTs are fine structures having nanometer-size diameters, making handling and processing of individual CNTs difficult. Therefore, in order to ensure ease of handling and processability for use in various applications, conventionally, carbon films produced by forming assemblies of a plurality of CNTs (hereinafter referred to as "carbon nanotube assemblies") into films have been conventionally used (see PTL 1, for example).

In PTL 1, a carbon film having an excellent mechanical strength is formed using carbon nanotube assemblies having a region at 10 nm or more where the Log differential pore capacity of pores having a pore size of 400 nm or more and 1500 nm or less measured by mercury intrusion porosimetry is 0.006 cm$^3$/g or less.

CITATION LIST

Patent Literature

PTL 1: JP 2018-145027 A

SUMMARY

Technical Problem

Under such a circumstance, in recent years, electromagnetic wave shields have been attracting attention as one application of carbon films. However, the conventional carbon films described above still need further improvement in their performance of blocking electromagnetic waves, i.e., electromagnetic wave shielding performance.

Therefore, the present disclosure is directed to providing a carbon film having an excellent electromagnetic wave shielding performance.

Solution to Problem

The present inventors have made extensive studies in order to achieve the foregoing object. The present inventors have studied the microstructure of carbon films formed from carbon nanotube assemblies and discovered that carbon films of which pore distribution curves indicating the relationship between the pore size and the Log differential pore capacity obtained based on mercury intrusion porosimetry are in a certain shape can favorably shield electromagnetic waves, thereby completing the present disclosure.

Specifically, this disclosure is directed to advantageously solving the above problem, and provides a carbon film of the present disclosure formed from carbon nanotube assemblies, wherein a pore distribution curve indicating a relationship between a pore size and a Log differential pore capacity obtained based on mercury intrusion porosimetry has at least one peak with a log differential pore capacity of 1.0 cm$^3$/g or more within a pore size range of 10 nm or more and 100 µm or less. When a pore distribution curve obtained by subjecting the carbon film to a measurement according to mercury intrusion porosimetry has at least one peak with a log differential pore capacity of 1.0 cm$^3$/g or more within a pore size range of 10 nm or more and 100 µm or less, the carbon film has an excellent electromagnetic wave shielding performance.

Here, the pore distribution curve based on mercury intrusion porosimetry can be obtained by the method described in Examples.

Here, the carbon film is preferably a free-standing film. When the carbon film is a free-standing film, the carbon film has an excellent handleability and has an increased degree of freedom in an arrangement of the sheet when used as an electromagnetic wave shield sheet, for example. In the present disclosure, a "free-standing film" refers to a film that can maintain its film shape on its own without being damaged without requiring a support.

Further, in the carbon film of the present disclosure, preferably, the pore distribution curve indicating the relationship between the pore size and the Log differential pore capacity obtained based on the mercury intrusion porosimetry has at least one peak with a log differential pore capacity of 10.0 cm$^3$/g or more within a pore size range of 2000 nm or more and 20 µm or less. When the carbon film satisfies this condition, the carbon film has an even better electromagnetic wave shielding performance.

Furthermore, in the carbon film of the present disclosure, preferably, a pore distribution curve indicating the relationship between the pore size and the Log differential pore capacity obtained from an adsorption isotherm of liquid nitrogen at 77 K based on the Barrett-Joyner-Halenda method has at least one peak with a log differential pore capacity of 2.5 cm$^3$/g or more within a pore size range of 10 nm or more and 100 nm or less. When a pore distribution curve obtained by subjecting the carbon film to a measurement according to the Barrett-Joyner-Halenda method (hereinafter abbreviated as "BJH method") has at least one peak with a log differential pore capacity of 2.5 cm$^3$/g or more within a pore size range of 10 nm or more and 100 nm or less, the carbon film has an even better electromagnetic wave shielding performance.

Here, the pore distribution curve based on the BJH method can be obtained by the method described in Examples.

In addition, in the carbon film of the present disclosure, the carbon nanotube assemblies of the present disclosure preferably satisfy at least one of the following conditions (1) to (3):

(1) a spectrum obtained by a Fourier transform infrared spectroscopic analysis on a carbon nanotube dispersion obtained by dispersing the carbon nanotube assemblies so that a bundle length is 10 µm or more, has at least one peak based on plasmon resonance of the carbon nanotube dispersion in a wavenumber range of more than 300 cm$^{-1}$ and 2000 cm$^{-1}$ or less;

(2) a maximum peak of the pore distribution curve indicating the relationship between the pore size and the Log differential pore capacity of the carbon nanotube assemblies obtained from the adsorption isotherm at 77 K of liquid nitrogen based on the Barrett-Joyner-Halenda method is in a pore size range of more than 100 nm and less than 400 nm; and (3) a two-dimensional spatial frequency spectrum of an electron microscopic image of the carbon nanotube assemblies has at least one peak within a range of 1 µm$^{-1}$ or more and 100 µm$^{-1}$ or less.

A carbon film made from carbon nanotube assemblies satisfying the above certain conditions has an even better electromagnetic wave shielding performance. Note that whether the above certain conditions are satisfied or not can be determined according to the method described in Examples.

Advantageous Effect

According to the present disclosure, it is possible to provide a carbon film having an excellent electromagnetic wave shielding performance.

DETAILED DESCRIPTION

Figure 1:
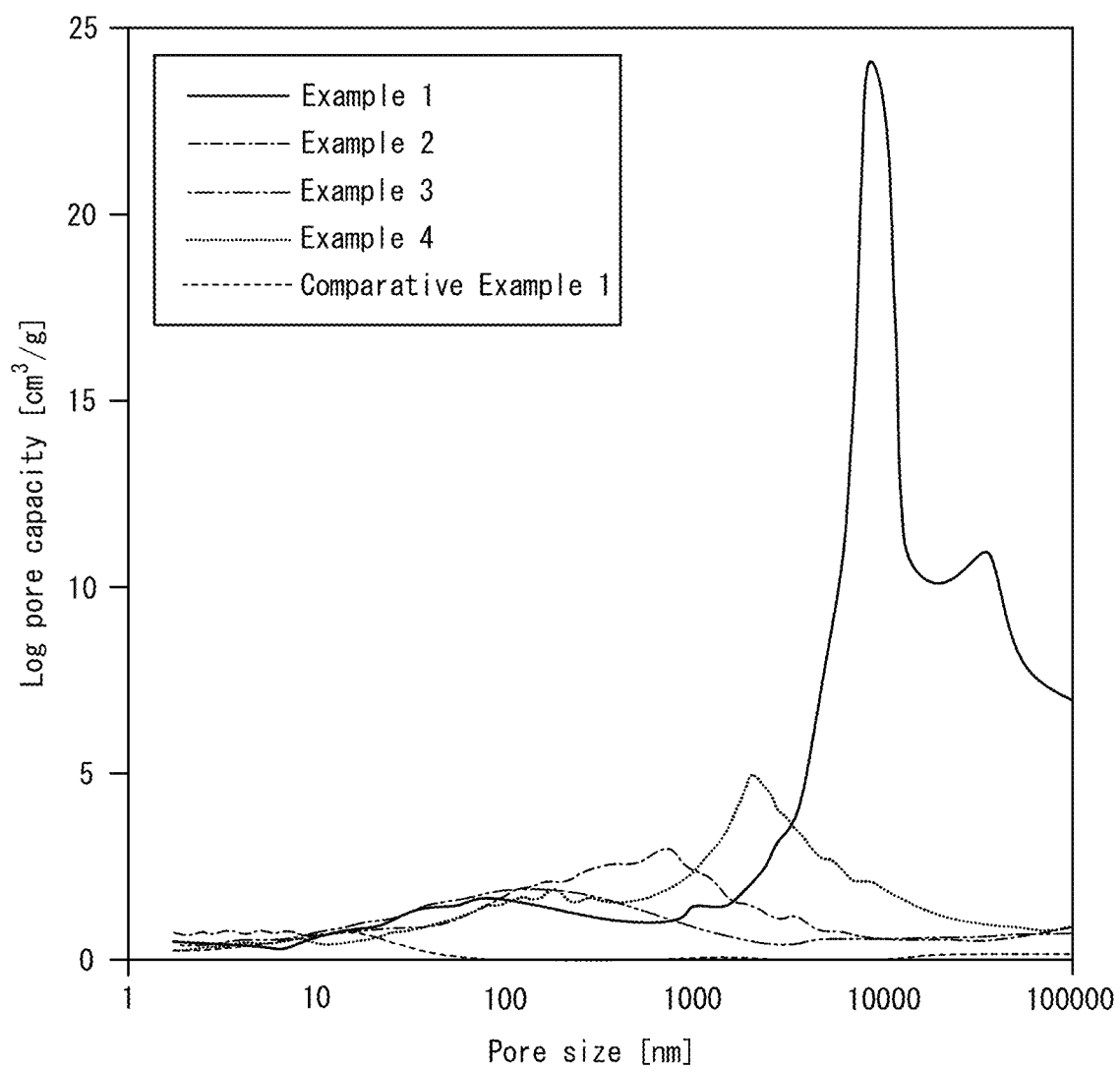
FIG. 1 Example of pore distribution curves of carbon films based on mercury intrusion porosimetry are illustrated.

An embodiment of the present disclosure will be described below.

A carbon film of the present disclosure is formed from assemblies of a plurality of carbon nanotubes (carbon nanotube assemblies). The carbon film of the present disclosure may, for example, contain components other than CNTs that are unavoidably mixed during the manufacturing processes of CNT assemblies and the carbon film. However, the ratio of CNTs in the carbon film is preferably 95 mass % or more, more preferably 98 mass % or more, even more preferably 99 mass % or more, still even more preferably 99.5 mass % or more, particularly preferably 100% (i.e., the carbon film consists only of CNTs).

Here, the carbon film of the present disclosure is made from carbon nanotube assemblies. The carbon film is characterized in that the pore distribution curve indicating the relationship between the pore size and the Log differential pore capacity obtained based on mercury intrusion porosimetry has at least one peak with a log differential pore capacity of 1.0 cm³/g or more in a pore size range from 10 nm or more and 100 µm or less. The carbon film of the present disclosure of which pore distribution curve based on mercury intrusion porosimetry has the certain shape as described above has an excellent electromagnetic wave shielding performance. Therefore, the carbon film of the present disclosure can be advantageously used, but is not particularly limited to, as an electromagnetic wave shield sheet, for example. Furthermore, the carbon film of the present disclosure is preferably a free-standing film. When the carbon film is a free-standing film, the carbon film has an excellent handleability, and the degree of freedom in the arrangement of the sheet can be enhanced when used as an electromagnetic wave shield sheet, for example.

In addition, from the viewpoint of a further improvement in the electromagnetic wave shielding performance, the pore distribution curve based on the BJH method preferably has at least one peak with a log differential pore capacity of 2.5 cm³/g or more within a pore size range of 10 nm or more and 100 nm or less.

In general, measurements mainly targeting pores with relatively small pore diameters, in other words, micropores and mesopores, are carried out based on the gas adsorption method, while measurements mainly targeting pores with relatively large pore diameters, in other words, mesopores and macropores, are carried out according to mercury intrusion porosimetry.

The carbon film of the present disclosure satisfies a pore distribution where at least one peak with a log differential pore capacity of 1.0 cm³/g or more can be detected in the pore diameter range corresponding to mesopores and macropores. In such a carbon film, because there are a certain number or more of spaces of appropriate size (in sizes of mesopores and macropores) between carbon nanotubes which are the constituent elements, it is assumed that the energy of electromagnetic waves entering the carbon film may be attenuated through diffused reflection of the electromagnetic waves by the spaces between the carbon nanotubes. The carbon film of the present disclosure is thus considered to have an excellent electromagnetic wave shielding performance.

(Pore Distribution Curve Based on Mercury Intrusion Porosimetry)

A pore distribution curve based on mercury intrusion porosimetry can be prepared according to the method described in Example in this specification. FIG. 1 illustrates examples of pore distribution curves based on mercury intrusion porosimetry of carbon films of the present disclosure. In FIG. 1, the pore distribution curves are plotted with the logarithm of the pore size dp (unit: nm) (Log pore size) on the horizontal axis and the Log differential pore capacity (dVp/d log dp, unit: cm³/g) on the vertical axis, in a pore size range of 1 nm or more and 100 µm or less (1000000 nm).

Figure 2:
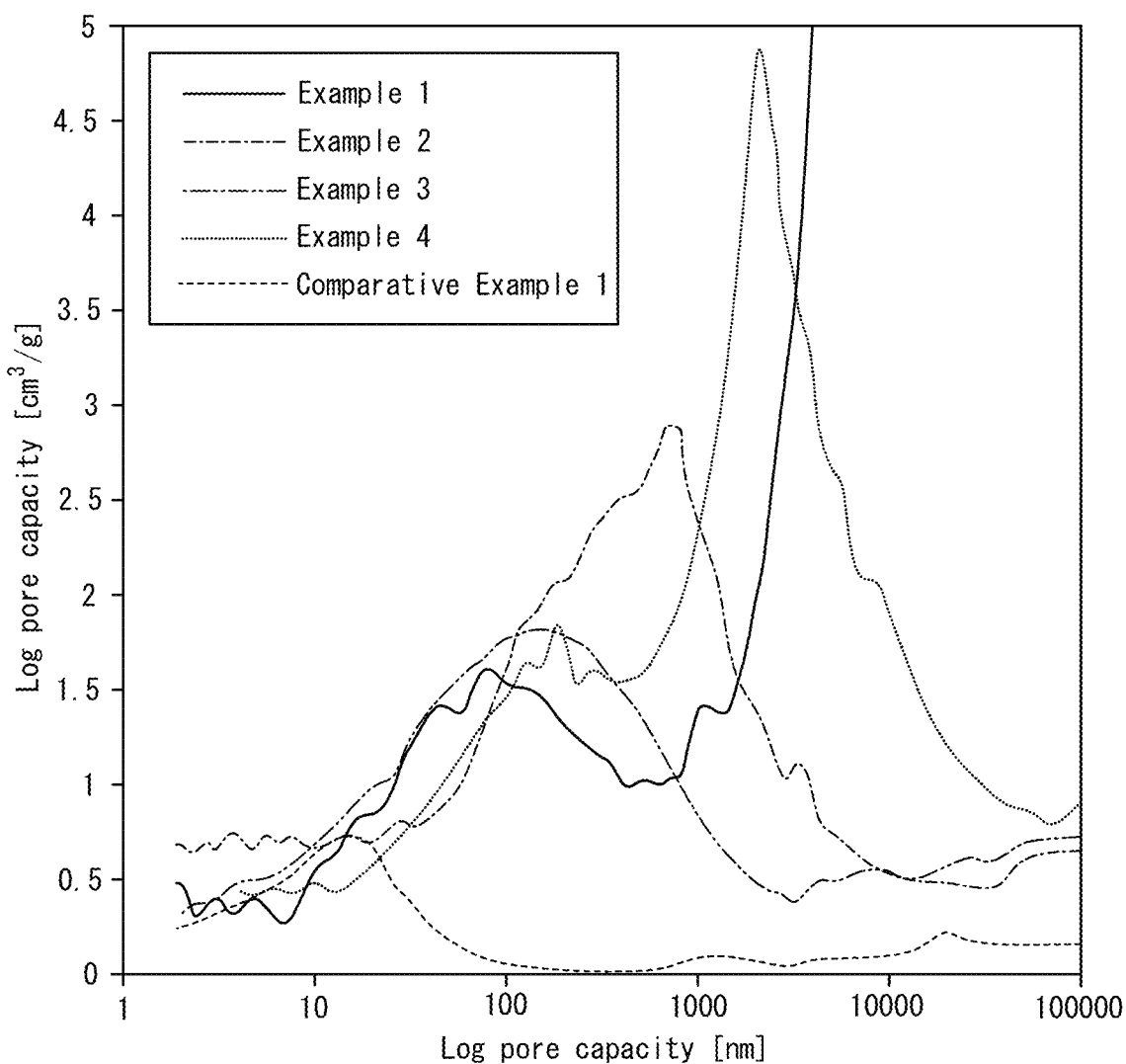
FIG. 2 The pore distribution curves in FIG. 1 with enlarged vertical axis are illustrated.

Of the five pore distribution curves depicted in FIG. 1, pore distribution curves of Examples 1 to 4 are pore distribution curves obtained by subjecting carbon films of the present disclosure to the measurement method according to mercury intrusion porosimetry. In FIG. 1, the curve of Example 1 is depicted in the solid line, the curve of Example 2 in the dashed and single dotted line, the curve of Example 3 in the dashed and double dotted line, the curve of Example 4 in the dotted line, and the curve of Comparative Example 1 in the dashed line. FIG. 2 depicts the pore distribution curves in FIG. 1 with the enlarged vertical axis. As apparent from FIG. 2, the pore distribution curves of the carbon films of Examples 1 to 4 have at least one peak with a log differential pore capacity of 1.0 cm³/g or more within a pore size range of 10 nm or more and 100 µm or less. In contrast, the pore distribution curve of the carbon film of Comparative Example 1 has no peak with a log differential pore capacity of 1.0 cm³/g or more within a pore size range of 10 nm or more and 100 µm or less. Here, the presence or absence of peak(s) and the position(s) of the peak(s) can be determined based on a pore distribution curve generated according to the method described in Examples.

More specifically, the pore distribution curve (in the solid line) of Example 1 has a maximum peak with a Log differential pore capacity of 22 cm$^3$/g at a pore size of 8225 nm, a peak with a Log differential pore capacity of 1.4 cm$^3$/g at a pore size of 60 nm, and a peak with a Log differential pore capacity of 9.1 cm$^3$/g at a pore size of 35580 nm. The pore distribution curve (in the dashed and single dotted line) of Example 2 has a maximum peak with a Log differential pore capacity of 2.9 cm$^3$/g at a pore size of 654 nm and a peak with a Log differential pore capacity of 1.1 cm$^3$/g at a pore size of 3558 nm. Furthermore, the pore distribution curve (in the dashed and double dotted line) of Example 3 has a peak with a Log differential pore capacity of 1.8 cm$^3$/g at a pore size of 138 nm. Finally, the pore distribution curve (in the dotted line) of Example 4 has a peak with a Log differential pore capacity of 4.9 cm$^3$/g at a pore size of 2057 nm.

Furthermore, in the pore distribution curve based on mercury intrusion porosimetry, the number of peaks with a log differential pore capacity of 1.0 cm$^3$/g or more within a pore size range of 10 nm or more and 100 µm or less is preferably two or more. In this case, the electromagnetic wave shielding performance provided by the carbon film can be further enhanced.

Furthermore, the pore distribution curve based on mercury intrusion porosimetry has at least one peak with a log differential pore capacity of 1.5 cm$^3$/g or more, preferably 2.0 cm$^3$/g or more, more preferably 4.0 cm$^3$/g or more, and even more preferably 10.0 cm$^3$/g or more, in a pore size range of 10 nm or more and 100 µm or less, preferably in pore size a range of 2000 nm or more and 20 µm or less. In this case, the electromagnetic wave shielding performance of the carbon film can be further enhanced. Note that the upper limit of the log differential pore capacity of a peak detected in the specified pore size range in the pore distribution curve based on mercury intrusion porosimetry is not particularly limited, but may be 50 cm$^3$/g or less, for example.

(Pore Distribution Curve Based on BJH Method)

The BJH method is a measurement method in which the distribution of pores (pore sizes) is determined on the assumption that pores have cylindrical shapes. A pore distribution curve based on the BJH method can be prepared using the method described in Example in this specification.

Figure 3:
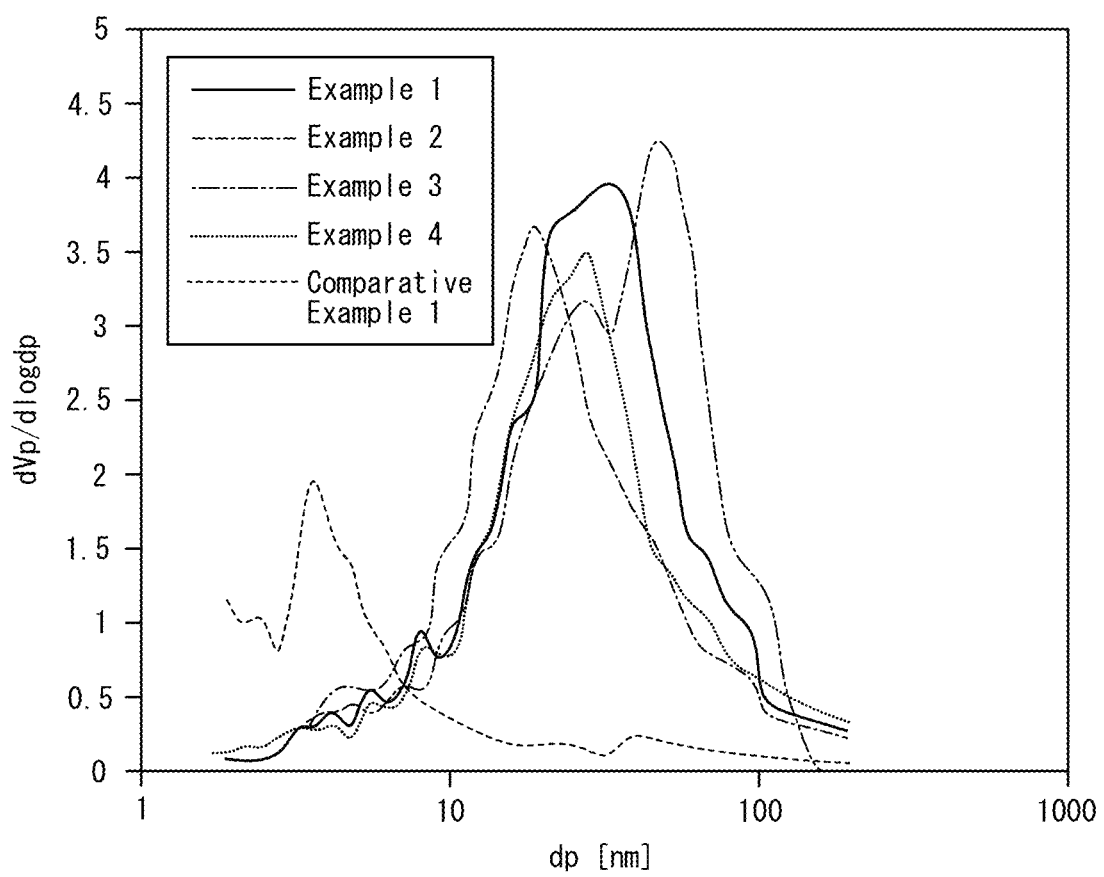
FIG. 3 Examples of pore distribution curves of carbon films based on the BJH method are illustrated.

Here, FIG. 3 illustrates examples of pore distribution curves based on the BJH method measured on carbon films of the present disclosure. In FIG. 3, the pore distribution curves are plotted with the logarithm of the pore size dp (unit: nm) (Log pore size) in the horizontal axis and the Log differential pore capacity (dVp/d log dp, unit: cm$^3$/g) in the vertical axis.

In FIG. 3, Examples 1 to 4 are pore distribution curves obtained by subjecting the carbon films of the present disclosure to the measurement method according to the BJH method. Here, the pore distribution curves of the carbon films of Examples 1 to 4 all have at least one peak with a Log differential pore capacity of 2.5 cm$^3$/g or more within a pore size range of 10 nm or more and 100 nm or less.

More specifically, the pore distribution curve according to the BJH method in Example 1 has a peak with a Log differential pore capacity of 4.0 cm$^3$/g at a pore size of 33 nm. The pore distribution curve according to the BJH method in Example 2 has a peak with a Log differential pore capacity of 3.7 cm$^3$/g at a pore size of 19 nm. The pore distribution curve according to the BJH method in Example 3 has a peak with a Log differential pore capacity of 4.1 cm$^3$/g at a pore size of 52 nm and a peak with a Log differential pore capacity of 3.1 cm$^3$/g at a pore size of 28 nm. The pore distribution curve according to the BJH method in Example 4 has a peak with a Log differential pore capacity of 3.5 cm$^3$/g at a pore size of 28 nm.

From the viewpoint of further enhancing the electromagnetic wave shielding performance of the carbon film, it is preferable that the pore distribution curve according to the BJH method has at least one peak within a pore size range of 12 nm or more and 95 nm or less, it is more preferable to have at least one peak within a pore size range of 15 nm or more and 90 nm or less, and it is even more preferable to have at least one peak within a pore size range of 18 nm or more and 85 nm or less.

Furthermore, from the viewpoint of further enhancing the electromagnetic wave shielding performance of the carbon film, the value of Log differential pore capacity at the pore distribution curve according to the BJH method of the above at least one peak is preferably 3.0 cm$^3$/g or more, and more preferably 3.5 cm$^3$/g or more. Note that the upper limit of the log differential pore capacity of a peak(s) detected in the specified pore size range in the pore distribution curve based on the BJH method is not particularly limited, but may be, for example, 20 cm$^3$/g or less.

(Production Method of Carbon Film)

Here, the carbon film of the present disclosure can be produced by forming a carbon film from carbon nanotube assemblies, when at least one of the following are satisfied:
CNT assemblies that satisfy at least any of the conditions (1) to (3) below are used as CNT assemblies; and
prior to the film formation from the CNT assemblies, a dry pulverization process is performed on the CNT assemblies.

<CNT Assembly>

Here, although the carbon film can be produced from well-known CNT assemblies such as CNT assemblies obtained by using the super growth method (see WO 2006/011655 A1), novel CNT assemblies that satisfy at least one of the conditions of (1) to (3) is preferred. A carbon film formed from CNT assemblies that satisfy at least one of the following conditions (1) to (3) has an excellent electromagnetic wave shielding performance.

(1) a spectrum obtained by a Fourier transform infrared spectroscopic analysis on a carbon nanotube dispersion obtained by dispersing the carbon nanotube assemblies so that a bundle length is 10 µm or more, has at least one peak based on plasmon resonance of the carbon nanotube dispersion in a wavenumber range of more than 300 cm$^{-1}$ and 2000 cm$^{-1}$ or less;

(2) the maximum peak of the pore distribution curve indicating the relationship between the pore size and the Log differential pore capacity of the carbon nanotube assemblies obtained from the adsorption isotherm at 77 K of liquid nitrogen based on the Barrett-Joyner-Halenda method is in a pore size range of more than 100 nm and less than 400 nm; and (3) a two-dimensional spatial frequency spectrum of an electron microscopic image of the carbon nanotube assemblies has at least one peak within a range of 1 µm$^{-1}$ or more and 100 µm$^{-1}$ or less.

Figure 4:
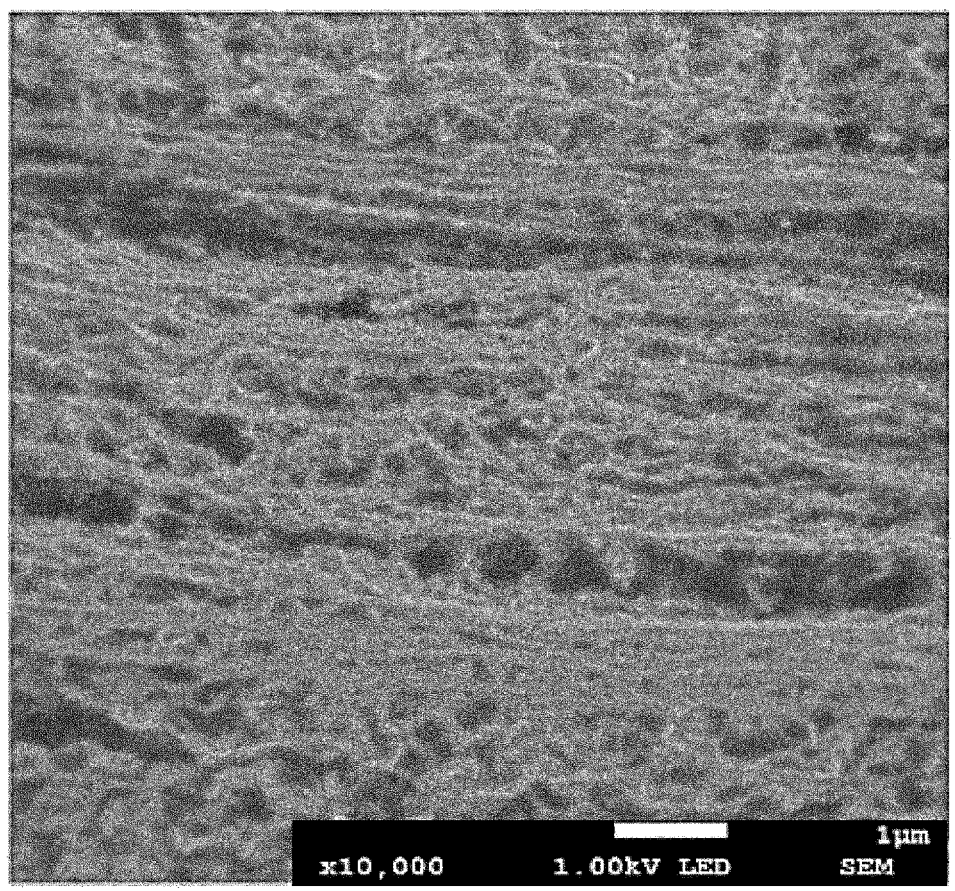
FIG. 4 An SEM image of a CNT assembly according to one example is depicted.

The reason why a carbon film made from the CNT assemblies satisfying at least one of the above-described conditions (1) to (3) has an excellent electromagnetic wave shielding performance has not been clarified yet, but is hypothesized as follows. FIG. 4 is a scanning electron microscopic (SEM) image of one example of a CNT assembly satisfying at least one of (1) to (3) above. As depicted in FIG. 4, the CNTs composing the CNT assembly satisfying at least one of the above-described conditions (1) to (3) have wave-like structures. It is considered that electromagnetic waves are diffusely reflected spaces between CNTs constituting the CNT assembly due to such a "wave-like structures". It is presumed that the energy of electromagnetic waves is lost in the course of such diffused reflection, which leads to high electromagnetic wave shielding performance. Hereinafter, the above-described conditions (1) to (3) which can be satisfied by the CNT assemblies of the present disclosure will be described in detail.

<<Condition (1)>>

The condition (1) specifies as follows: "a spectrum obtained by a Fourier transform infrared spectroscopic analysis on a carbon nanotube dispersion obtained by dispersing the carbon nanotube assemblies such that the bundle length is 10 μm or more, has at least one peak based on plasmon resonance of the carbon nanotube dispersion in a wavenumber range of more than 300 $cm^{-1}$ and 2000 $cm^{-1}$ or less". Conventionally, a high absorptivity in the far infrared region is known as one of optical characteristics of CNTs. It is considered that this high absorptivity in the far infrared region is attributable to the diameters and lengths of the CNTs. The relationship between the absorptivity in the far-infrared region, more specifically, the plasmon resonance-based peak of CNTs, and the lengths of the CNTs is discussed in detail in non-patent literature (T. Morimoto et. al., "Length-Dependent Plasmon Resonance in Single-Walled Carbon Nanotubes," pp 9897-9904, Vol. 8, No. 10, ACS NANO, 2014). Based on the discussions described in the above non-patent literature and our own findings, the present inventors have built a hypothesis in that the position of a detected plasmon resonance-based peak of CNTs in a spectrum obtained by a Fourier transform infrared spectroscopic analysis may be somewhat affected by the distance between defect points in the CNTs, and have verified this hypothesis. The present inventors then have found that the position of a detected plasmon resonance-based peak of CNTs can serve as the index corresponding to the path between bending points in a CNT having a wave-like structure, and have established the above condition (1).

In the condition (1), if a plasmon resonance-based peak of CNTs is present in a wave number range of greater than 300 $cm^{-1}$ and 2000 $cm^{-1}$ or less, preferably in a wave number range of 500 $cm^{-1}$ or more and 2000 $cm^{-1}$ or less, more preferably in a wave number range of 700 $cm^{-1}$ or more and 2000 $cm^{-1}$ or less, the CNTs can provide a good electric magnetic wave shielding performance when being made into a carbon film.

Figure 5:
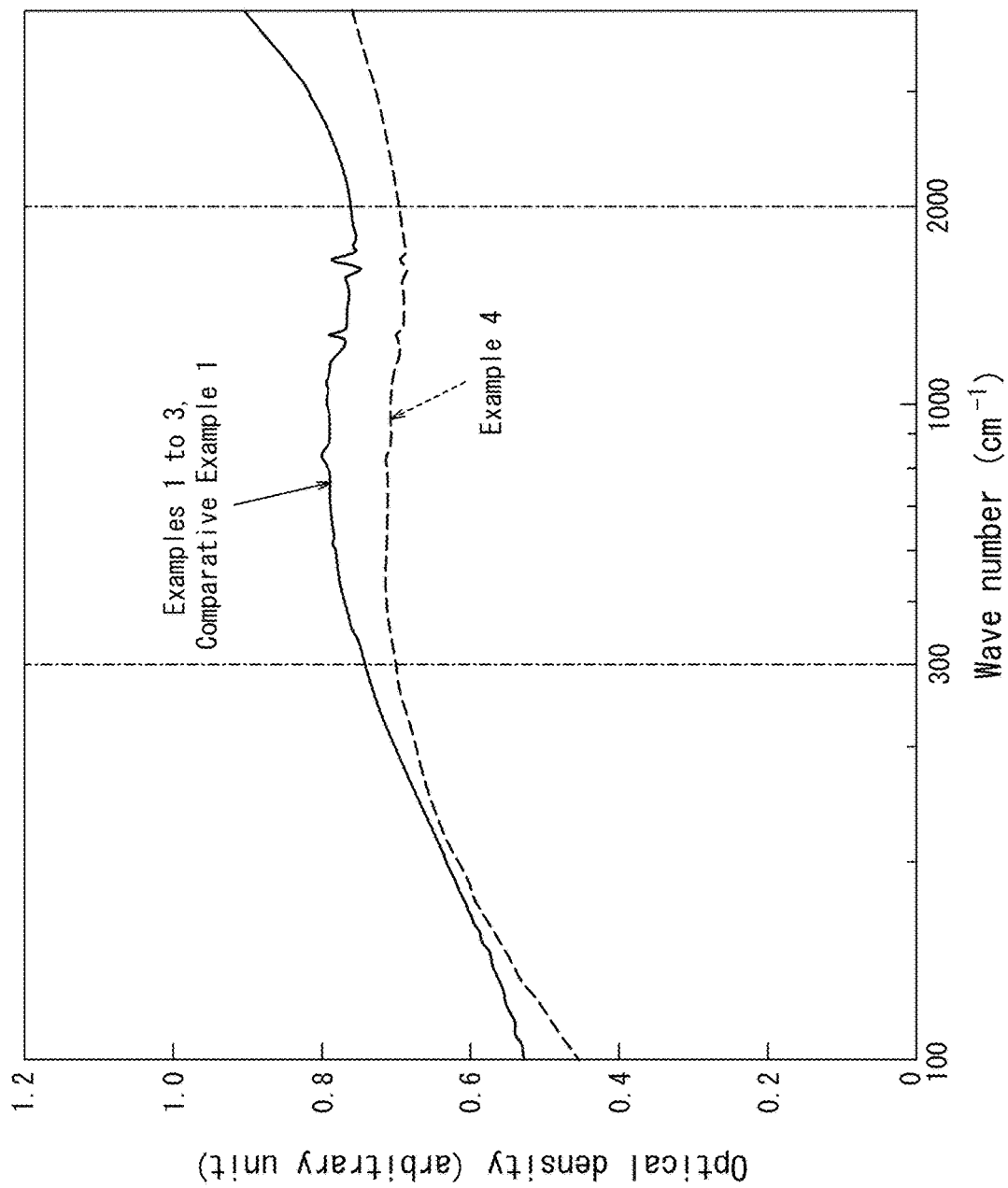
FIG. 5 FIR resonance chart obtained on a CNT assembly according to one example is depicted.

FIG. 5 is a spectrum (FIR resonance chart) obtained from a Fourier transform infrared spectroscopic analysis of CNT assemblies according to one example. As apparent from FIG. 5, in a spectrum obtained, sharp peaks are observed in the vicinity of the wave number of 840 $cm^{-1}$, in the vicinity of 1300 $cm^{-1}$, and in the vicinity of 1700 $cm^{-1}$, other than the relatively gentle plasmon resonance-based peak of a CNT dispersion. These sharp peaks are not "plasmon resonance-based peaks of carbon nanotube dispersion", and each correspond to infrared absorption derived from functional groups. More specifically, the sharp peak in the vicinity of a wave number of 840 $cm^{-1}$ is attributable to out-of-plane bending vibration of C—H; the sharp peak in the vicinity of a wave number of 1300 $cm^{-1}$ is attributable to expansion and contraction vibration of epoxy three-membered rings; and the sharp peak in the vicinity of a wave number of 1700 $cm^{-1}$ is attributable to expansion and contraction vibration of C=O. As mentioned in the above non-patent literature by T. Morimoto et al., in the wave number range of more than 2000 $cm^{-1}$, a peak similar to the S1 peak is detected other than plasmon resonance-based peaks. Accordingly, the present inventors have established $2000^{-1}$ cm, or less as the upper limit for making a determination whether or not a plasmon resonance-based peak of the CNT dispersion is present in the condition (1).

Herein, in the condition (1), for obtaining a spectrum by a Fourier transform infrared spectroscopic analysis, a CNT dispersion needs to be obtained by dispersing the CNT assembly such that the bundle length is 10 μm or more. For example, a dispersion liquid where a CNT dispersion having a bundle length of 10 μm or more is dispersed in water can be obtained by blending the CNT assemblies, water, and a surfactant (e.g., sodium dodecylbenzenesulfonate) an appropriate ratio and agitating by means of ultrasonic waves or the like for a predetermined time duration.

The bundle length of the CNT dispersion can be determined by analyzing the dispersion with a particle size measurement apparatus in the wet image analysis type. Such a measurement apparatus calculates the area of each CNT dispersion from a captured image of the dispersion, and determines the diameter of a circle corresponding to the calculated area (hereinafter, sometimes also referred to as ISO area diameter). In this specification, the bundle length of each dispersion is defined as the value of the ISO area diameter obtained in this manner.

<<Condition (2)>>

The condition (2) specifies as follows: "the maximum peak in a pore distribution curve is located in a pore size range of more than 100 nm and less than 400 nm." The pore distribution curve of the carbon nanotube assembly can be obtained from an adsorption isotherm at 77 K of liquid nitrogen based on the BJH method. The peak in the pore distribution curve measured on a carbon nanotube assembly in a range of over 100 nm means that CNTs in the carbon nanotube assembly are spaced apart from each other with certain spaces, so that the CNTs are not excessively densely aggregated. The upper limit of 400 nm is the measurement limit in the measurement apparatus (BELSORP-mini II) used in Examples.

Here, from the viewpoint of further enhancing the electromagnetic wave shielding performance of the carbon film, the value of the Log differential pore capacity at the maximum peak of the pore distribution curve of the CNT assembly is preferably 2.0 $cm^3/g$ or more.

<<Condition (3)>>

The condition (3) specifies as follows: "a two-dimensional spatial frequency spectrum of an electron microscopic image of the carbon nanotube assemblies has at least one peak within a range of 1 $\mu m^{-1}$ or more and 100 $\mu m^{-1}$ or less". A determination whether or not this condition is satisfied can be determined as follows. First, a CNT assembly to be analyzed is observed under an electron microscope (e.g., electrolytic radiation scanning electron microscope) at a magnification (e.g., 10000×), and a plurality of (e.g., 10) electron microscopic images in a field of view of 1 cm square are obtained. Each of the plurality of electron microscopic images obtained is analyzed by fast Fourier transform (FFT) to obtain a two-dimensional spatial frequency spectrum. Each of the obtained two-dimensional spatial frequency spectrum of the plurality of electron microscopic images is binarized, and the average of the peak positions of the highest frequency is calculated. If the average of the obtained peak positions is within the range of 1 $\mu m^{-1}$ or more 100 $\mu m^{-1}$ or less, it is determined that the condition (3)

was satisfied. Here, "peaks" used in the above determination shall be distinct peaks which are identified by carrying out isolated point detection processing (in other words, a reverse operation of isolated point removal). Accordingly, if no distinct peak is identified within a range of 1 $\mu m^{-1}$ or more and 100 $\mu m^{-1}$ or less in isolated point detection processing, it is determined that the condition (3) is not satisfied Herein, from the viewpoint of further enhancing the electromagnetic wave shielding performance of the carbon film, the peak of the two-dimensional spatial frequency spectrum is preferably present in a range of 2.6 $\mu m^{-1}$ or more and a range of 100 $\mu m^{-1}$ or less.

From the viewpoint of further enhancing the electromagnetic wave shielding performance of the carbon film, the CNT assemblies preferably satisfy at least two of the conditions (1) to (3), and more preferably satisfies all of the conditions (1) to (3).

<<Other Properties>>

O the conditions described in (1) to (3) above, the CNT assemblies that can be used to form the carbon film of the present disclosure preferably has the following properties.

For example, the CNT assemblies have a total specific surface area according to the BET method of preferably 600 $m^2/g$ or more, more preferably 800 $m^2/g$ or more, and preferably 2,600 $m^2/g$ or less, more preferably 1,400 $m^2/g$ or less. Further, the CNT assemblies which have undergone opening formation treatment preferably has a total specific surface area according to the BET method of 1,300 $m^2/g$ or more. CNT assemblies with a high specific surface area can further improve the electromagnetic wave shielding performance of the carbon film by allowing better diffused reflection of electromagnetic waves inside the carbon film. The CNT assemblies may include single-welled CNTs as the main component, and may also include two-welled CNTs and multi-welled CNTs to the extent that the functionalities are not impaired. The total specific surface area of CNTs according to the BET method can be measured using, for example, a BET specific surface area measurement apparatus according to JIS Z 8830.

The CNTs composing the CNT assembly has an average height of preferably 10 $\mu m$ or more and 10 cm or less, more preferably 100 $\mu m$ or more and 2 cm or less. When the average height of the CNTs composing the CNT assemblies is 10 $\mu m$ or more, aggregation with adjacent CNT bundles is prevented, so that the CNTs can be easily dispersed. When the average height of the CNTs composing the CNT assemblies is 10 $\mu m$ or more, a network of the CNTs can be more easily formed, so that the CNTs can be suitably used in applications in which higher conductivity or mechanical strength are required. Further, when the average height of the CNTs composing the CNT assemblies is 10 cm or less, rapid generation can be achieved, which reduces adhesion of carbonaceous impurities and improves the specific surface area. Furthermore, when the average height of the CNTs composing the CNT assemblies is 2 cm or less, the CNTs become more easily dispersed. The average height of the CNTs can be determined by measuring the lengths of 100 randomly-selected CNTs under observation by scanning electron microscopy (SEM).

The CNT assemblies preferably have a tap bulk density of 0.001 $g/cm^3$ or more and 0.2 $g/cm^3$ or less. Because adhesion between CNTs in CNT assemblies having a density in this range is not excessively strong, the CNT assemblies have an excellent dispersibility and can be molded into various shapes. When the tap bulk density of the CNT assemblies is 0.2 $g/cm^3$ or less, the CNT assemblies can be dispersed homogenously in a solvent or the like by agitating because adhesion between CNTs composing the CNT assembly is weaker. Moreover, when the tap bulk density is 0.001 $g/cm^3$ or more, the unity of the CNT assemblies improve, making handle of the CNT assemblies easier. The tap bulk density is an apparent bulk density when a powdery CNT assembly is filled in a container, and powdery particles are tightly packed with reduced spaces by tapping or vibrating the container or otherwise, so that the powder particles.

Further, the CNTs composing the CNT assemblies has an average outer diameter of preferably 0.5 nm or more, more preferably 1.0 nm or more, and preferably 15.0 nm or less, more preferably 10.0 nm or less, and even more preferably 5.0 nm or less. When the average outer diameter the CNTs is 0.5 nm or more, bundling of the CNTs is reduced and a high specific surface area can be maintained. When the average outer diameter the CNTs is 15.0 nm or less, the ratio of multi-walled CNTs is smaller and a high specific surface area can be maintained. The average outer diameter of the CNTs is determined by measuring the diameters (outer diameters) of 100 randomly-selected CNTs under observation by transmission electron microscopy (TEM). The average diameter (Av) and the standard deviation (6) of the CNTs may be adjusted by changing the production method and the production conditions of the CNTs, or may be adjusted by combining a plurality of types of CNTs obtained by different production methods.

The CNT assemblies preferably have a G/D ratio of 1 or more and 50 or less. When the G/D ratio of the CNT assemblies is less than 1, it is considered that the crystallinity of single-welled CNTs is low, the amount of contaminants such as amorphous carbon is high, and the content of multi-welled CNTs is high. On the other hand, when the G/D ratio of the CNT assemblies is greater than 50, the linearity is increased, the CNTs become more likely to form bundles with smaller spaces, and specific surface areas may be reduced. The G/D ratio is an index commonly used to evaluate the quality of CNTs. In a Raman spectrum of CNTs as measured by a Raman spectrometer, vibration modes referred to as the "G band" (near 1,600 $cm^{-1}$) and "D band" (near 1,350 $cm^{-1}$) are observed. The G band corresponds to vibration modes caused by a hexagonal lattice structure of graphite forming cylindrical surfaces of the CNTs and the D band corresponds to vibration modes caused by amorphous locations. Therefore, as the peak intensity ratio of the G band to the D band (G/D ratio) increases, the CNTs are evaluated to have higher crystallinity (linearity).

The purity of the CNT assemblies are preferably as high as possible for achieving a high specific surface area. As used herein, the purity is the carbon purity, and is a value indicating how much percent of the mass of the CNT assemblies is composed of carbon. Although there is no upper limit on the purity for achieving a high specific surface area, it is difficult to obtain a CNT assembly of 99.9999 mass % or more for manufacturing reasons. If the purity is less than 95 mass %, a specific surface area of more than 1000 $m^2/g$ is difficult to be achieved without the opening formation treatment. Further, if metal impurities are contained and the carbon purity is less than 95 mass %, the metal impurities react with oxygen in the opening formation treatment to thereby hinder opening of the CNTs, making increase in the specific surface area difficult. From these viewpoints, the purity of the single-welled CNTs is preferably 95 mass % or more.

For specified CNT assemblies that satisfy at least any of the above conditions (1) to (3), the purity thereof can usually be 98 mass % or more, preferably 99.9 mass % or more, without any purification process. Such CNT assemblies hardly have any impurities mixed therein and can sufficiently exhibit the various inherent properties of CNTs. The carbon purity of the CNT assemblies can be determined by an elemental analysis using X-ray fluorescence, thermogravimetric analysis (TGA), or other techniques.

<<Production Method of CNT Assemblies>>

The method of producing CNT assemblies is not limited, and the production conditions can be adjusted according to the desired properties. For example, upon producing CNT assemblies that satisfy at least any of the above conditions (1) to (3), the conditions during the growth of CNT assemblies must satisfy all of the following (a) to (c):

(a) the growth rate of the CNT assemblies is 5 µm/min or more;

(b) the concentration of a catalyst activating material in the growth atmosphere of the CNT assemblies is 4 volume % or more; and (c) during growth of the CNT assemblies, an obstacles is present in the growth direction of the CNTs which are to compose the CNT assemblies.

CNT assemblies that satisfy at least any of the above conditions (1) to (3) can be efficiently produced by a production method that satisfies all of the above (a) to (c). Such a production method is not particularly limited as long as the above-described conditions (a) to (c) are satisfied during growth of the CNT assemblies, and a CNT synthesis processes according to any of well-known techniques such as the fluidized bed method, the moving bed method, and the fixed bed method can be employed. As used herein, the fluidized bed method refers to a synthesis method in which CNTs are synthesized while a particulate carrier on which a catalyst for synthesizing CNTs is supported (hereinafter, also referred to as a particulate catalyst carrier) is fluidized. Further, the moving bed method and the fixed bed method refer to synthesis methods for synthesizing CNTs without fluidizing a carrier (particulate carrier or plate-like carrier) on which a catalyst is supported.

In one example, the production method satisfying all of (a) to (c) described above includes a catalyst carrier formation step of forming a catalyst carrier, a CNT synthesis step of synthesizing CNTs using the catalyst carrier obtained in the catalyst carrier formation step, and a recovery step of recovering the CNTs synthesized in the CNT synthesis step. The catalyst carrier formation step can be carried out according to a well-known wet or dry catalyst supporting method. The recovery step can be carried out using a well-known separation and recovery apparatus such as a classifier.

[CNT Synthesis Step]

The CNT synthesis step is carried out such that all of the above-described conditions (a) to (c) are satisfied during growth of CNTs. Specifically, the condition (a) that "the growth rate of the carbon nanotube assembly is 5 µm/min or more" can be satisfied by appropriately adjusting the concentration, the temperature, and the like of a source gas serving as the carbon source in the CNT growth atmosphere. Herein, the source gas serving as the carbon source is not particularly limited, and gases of hydrocarbons such as methane, ethane, ethylene, propane, butane, pentane, hexane, heptane, propylene, and acetylene; gases of lower alcohols such as methanol and ethanol; and mixtures of these can also be used. Furthermore, the source gas may be diluted with an inert gas. Moreover, from the viewpoint of further increasing the dispersibility of the CNT assemblies obtained and further enhancing the electromagnetic wave shielding performance of the carbon film, the growth rate of the CNT assemblies is preferably 10 µm/minute or more. The temperature can be adjusted, for example, within a range of 400° C. or higher 1100° C. or lower.

In the CNT growth atmosphere, the source gas serving as the carbon source preferably contains ethylene. Heating ethylene within a certain temperature range (700° C. or higher and 900° C. or lower) can promote a decomposition reaction of ethylene, which leads to fast growth of CNTs when the decomposed gas is brought into contact with the catalyst. However, if the thermal decomposition time is too long, the decomposition reaction of ethylene proceeds excessively, causing deactivation of the catalyst and adhesion of carbon impurities onto the CNT assemblies. In production of the CNT assemblies of the present disclosure, in an ethylene concentration range of an of 0.1 volume % or more and 40 volume % or less, the thermal decomposition time ranges preferably 0.5 seconds or longer and 10 seconds or shorter. If the thermal decomposition time is shorter than 0.5 seconds, thermal decomposition of ethylene is insufficient, which makes fast growth of CNT assemblies having a large specific surface area difficult. If the thermal decomposition time is longer than 10 seconds, ethylene is decomposed excessively and carbon impurities are generated in a large amount, which causes deactivation of the catalyst and lowered quality of the CNT assemblies. The thermal decomposition time is calculated from the following equation:

$$(\text{Thermal decomposition time}) = (\text{volume of heating channel})/\{(\text{flow rate of source gas}) \times (273.15+T)/273.15\}$$

where the volume of the heating channel is the volume of a flow path heated to a predetermined temperature T ° C., through which the source gas is made to flow before the source gas is brought into contact with the catalyst, and the flow rate of the source gas is a flow rate at 0° C. under 1 atm.

Further, the condition (b) that "the concentration of a catalyst activating material in the growth atmosphere of the carbon nanotube assemblies is 4 volume % or more" can be satisfied by appropriately adjusting the feeding rate of the catalyst activating material fed during the CNT growth. From the viewpoint of further enhancing the electromagnetic wave shielding performance of the carbon film, the concentration of a catalyst activating material in the growth atmosphere of the CNT assemblies is preferably 5 volume % or more. The catalyst activating material is not particularly limited, and examples thereof include water, oxygen, ozone, acidic gases, and nitrogen oxide; oxygen-containing compounds having a low carbon number, such as carbon monoxide and carbon dioxide; alcohols such as ethanol and methanol; ethers such as tetrahydrofuran; ketones such as acetone; aldehydes; esters; and mixtures thereof. Of these, carbon dioxide is preferred. Note that a material containing both carbon and oxygen, such as carbon monoxide and alcohols, may serve as both a source gas and a catalyst activating material. For example, carbon monoxide severs as a catalyst activating material when combined with a more reactive source gas such as ethylene, and severs as a source gas when combined with a catalyst activating material which has a stronger catalyst activating action even in a trace amount such as water.

Furthermore, the condition (c) that "during synthesis of the carbon nanotube assemblies, an obstacle is present in the growth direction of the carbon nanotubes which are to compose the carbon nanotube assemblies" can be satisfied by selecting the fluidized bed method in the CNT synthesis step or adjusting the interval to dispose the catalyst carrier in the moving bed method or the fixed bed method.

Here, in the case where CNTs are synthesized by the fluidized bed method, the CNT synthesis step may be carried out, for example, by supplying a source gas while supplying a gas from below to keep the particulate catalyst support flowing, or by feeding the source gas while continuously conveying the particulate catalyst support by screw rotations.

The catalyst carrier has a carrier and a catalyst supported on the surface of the carrier. The carrier is the portion forming a matrix structure such that the catalyst is adhered to, fixed to, formed as a film on, or formed on the surface of the carrier for supporting the catalyst. The carrier may be structured only from the carrier, or a carrier may be provided with an optional under layer for satisfactorily supporting the catalyst on the surface of the carrier. The carrier is preferably particulate, and the particle size thereof in terms of volume average particle size is preferably 1 mm or less, more preferably 0.7 mm or less, and even more preferably 0.4 mm or less, and is preferably 0.05 mm or more. When the particle size is equal to or smaller than any of the above upper limits, the CNT bundle to be grown becomes thinner, which is advantageous to form a wave-like structure. The particle density in terms of apparent volume is preferably 3.8 $g/cm^3$ or more, more preferably 5.8 $g/cm^3$ or more, and is preferably 8 $g/cm^3$ or less. When the particle density is equal to or higher than any of the above lower limits, the force applied to the CNT bundle during growth is increased, which is advantageous to form a wave-like structure. The material of the carrier is preferably a metal oxide containing one or more elements of Al and Zr. Of these, zirconia beads containing Zr with a high elemental amount are particularly preferred.

For example, in the case where a particulate carrier is used, the method to making the catalyst to be supported on the surface of the particulate carrier is exemplified by the method by using a rotary drum type coating apparatus having a substantially cylindrical rotary drum. In the case where the catalyst is made to be supported after a base layer is disposed on the surface of the substrate, a solution containing a component which can form the base layer is sprayed and dried before spraying and drying of the catalyst solution, so that the base layer is formed on the surface of the support. Such a method enables the catalyst layer and the base layer to be relatively easily and evenly formed.

In the CNT synthesis step, before the "growth step" is carried out so that the above-described conditions (a) to (c) are satisfied, a "formation step" of reducing the catalyst supported on the catalyst carrier may be carried out. Moreover, after the growth step is terminated, a "cooling step" of cooling the catalyst carrier on which the CNT has grown may be carried out. In the "formation step", for example, at least one of a reducing gas atmosphere which is an atmosphere including the catalyst carrier or the catalyst carrier is heated to reduce and microparticulate the catalyst supported on a catalyst carrier. The temperature of the catalyst carrier or the reducing gas atmosphere in the formation step is preferably 400° C. or higher and 1100° C. or lower. The time to carry out the formation step may be 3 minutes or longer and 120 minutes or shorter. Note that the reducing gas may, for example, be hydrogen gas, ammonia gas, water vapor, or a gas that is a mixture of these. Furthermore, the reducing gas may be a mixed gas obtained by mixing these gases with an inert gas such as helium gas, argon gas, or nitrogen gas. On the other hand, in the "cooling step", the catalyst carrier on which the CNTs have grown is cooled in an inert gas environment. In this step, an inert gas similar to the inert gas which can be used in the growth step may be used as the inert gas. Further, in the cooling step, the temperature of the catalyst carrier on which the CNT has grown is lowered to a temperature of preferably 400° C. or lower, more preferably 200° C. or lower.

<Dry Pulverization Process>

In production of the carbon film of the present disclosure, a dry pulverization process may be applied to the CNT assemblies prior to film formation, if necessary. In the present disclosure, the "dry pulverization process" means a pulverization process in the state where a subject to be pulverized is substantially free of a solvent (e.g., in the state where the solid concentration is 95% or more).

There is no limitation on the pulverization apparatus that can be used in the dry pulverization process as long as the apparatus can apply a physical load to assemblies formed from fine structures by means of agitation or the like. A mixer equipped with a rotating vane may be used as such an apparatus.

The pulverization conditions are not limited. For example, when a mixer equipped with a rotating vane is used as the pulverization apparatus, the rotation speed is preferably 500 rpm or more and 5000 rpm or less, and the pulverization time is preferably 10 seconds or longer and 20 minutes or shorter.

<Film Formation>

The carbon film of the present disclosure can be obtained by forming the CNT assemblies into a film. Here, the method of forming the CNT assemblies into a film is not particularly limited, but the method of preparing a CNT dispersion liquid by dispersing the CNT assemblies into a dispersion medium such as water or an organic solvent, and removing at least a part of the dispersion medium from the CNT dispersion liquid is preferred.

The method of preparing a CNT dispersion is not limited, but a CNT dispersion can be obtained by dispersing CNT assemblies into a dispersion medium by a well-known method such as a dispersion method using a stirring vane, a dispersion method using ultrasonic waves, and a dispersion method using shear force. Here, from the viewpoint of further enhancing the electromagnetic wave shielding performance of the resulting carbon film, it is preferable that the CNTs are appropriately dispersed in the CNT dispersion liquid. Preferably, the CNT dispersion is free of a dispersing agent. In other words, preferably, the CNT dispersion consists substantially only of CNTs and a dispersion medium. In this specification, "the CNT dispersion consists substantially only of CNTs and a dispersion medium" means that more than 99.9 mass % of the components of the CNT dispersion consist of the CNTs and unavoidable impurities associated with the CNTs, and the dispersion medium and unavoidable impurities associated with the dispersion medium.

The method of removing the dispersion medium from the CNT dispersion may be a well-known method such as filtration, drying, and the like.

Well-known filtration methods such as natural filtration, reduced-pressure filtration (suction filtration), pressurized filtration, and centrifugal filtration can be used without any particular limitation.

Well-known drying methods such as hot air drying, vacuum drying, hot-roll drying, and infrared irradiation can be used. Although no specific limitation is placed on the drying temperature and time, the drying temperature is normally from room temperature to 200° C. and the drying time is normally 1 hour or longer and 48 hours or shorter. Further, drying may be carried out on a well-known substrate without any particular limitation.

Of these, it is preferable that at least drying is used to remove the dispersion medium.

Note that filtration and drying as described above can also be used in combination. For example, the carbon film of the present disclosure can be obtained by forming a film-like filtrate (primary sheet) through filtration of the CNT dispersion liquid and further drying the filtrate.

(Properties of Carbon Film)

Here, the thickness of the carbon film of the present disclosure is preferably 5 μm or more, more preferably 10 μm or more, and is preferably 200 μm or less, and more preferably 150 μm or less. When the thickness is 5 μm or more, the carbon film can have sufficient mechanical strength and exhibit an even better electromagnetic wave shielding performance. Furthermore, when the thickness is 200 μm or less, the carbon film can be made lighter.

Note that the "thickness" of the carbon film can be measured by the method described in Examples section.

EXAMPLES

The following provides more specific description of the present disclosure with reference to examples. However, the present disclosure is not limited to these examples.

In Examples and Comparative Example, measurements and evaluations were carried out as follows.

<Fourier Transform Infrared Spectroscopic Analysis (FT-IR)>

To 10 mg of CNT assemblies, 100 g of water containing sodium dodecylbenzenesulfonate as a surfactant at a concentration of 1 mass % was added. The resultant was agitated in an ultrasonic bath at 45 Hz for 1 minute to obtain 100 ml of a dispersion liquid of each of the CNT assemblies.

Each dispersion liquid prepared as described above was two-fold diluted with a solvent having the same composition, which was dropped onto a silicon substrate and dried. Thereafter, a measurement of the effective plasmon length was carried out based on a plasmon far-infrared (FIR) resonance peak using a Fourier transform infrared spectrophotometer. The effective plasmon lengths are summarized in Table 1. The FIR resonance chart of the obtained FIR spectra is depicted in FIG. 5. As indicated in FIG. 5, a peak of the optical density was observed at greater than 300 cm$^{-1}$. Note that the position of each plasmon peak top was determined based on the approximation curve by polynomial fitting using drawing software.

<Measurement of Bundle Length of CNTs>

Using each dispersion liquid prepared for the FT-IR measurements, the average ISO area diameter of CNT dispersions present in the dispersion liquid was measured using a circulation-type image analysis particle size distribution meter "CF-3000", manufactured by JASCO International Co., Ltd.), and the obtained value was used as the CNT bundle length. The conditions for the analysis were as follows.

<Conditions for Analysis>

Injection volume: 50 ml (sampling volume: 1.2%)
Flow cell spacer: 1000 μm
Front lens magnification: 2×
Telecentric lens magnification: 0.75×
Length per pixel: 2.3 μm per pixel While each dispersion liquid was circulated, measurements were made 4 times under the same conditions, and the arithmetic mean value of measured values was obtained.

<Preparation of Pore Distribution Curve (CNT Assemblies)>

Figure 6:
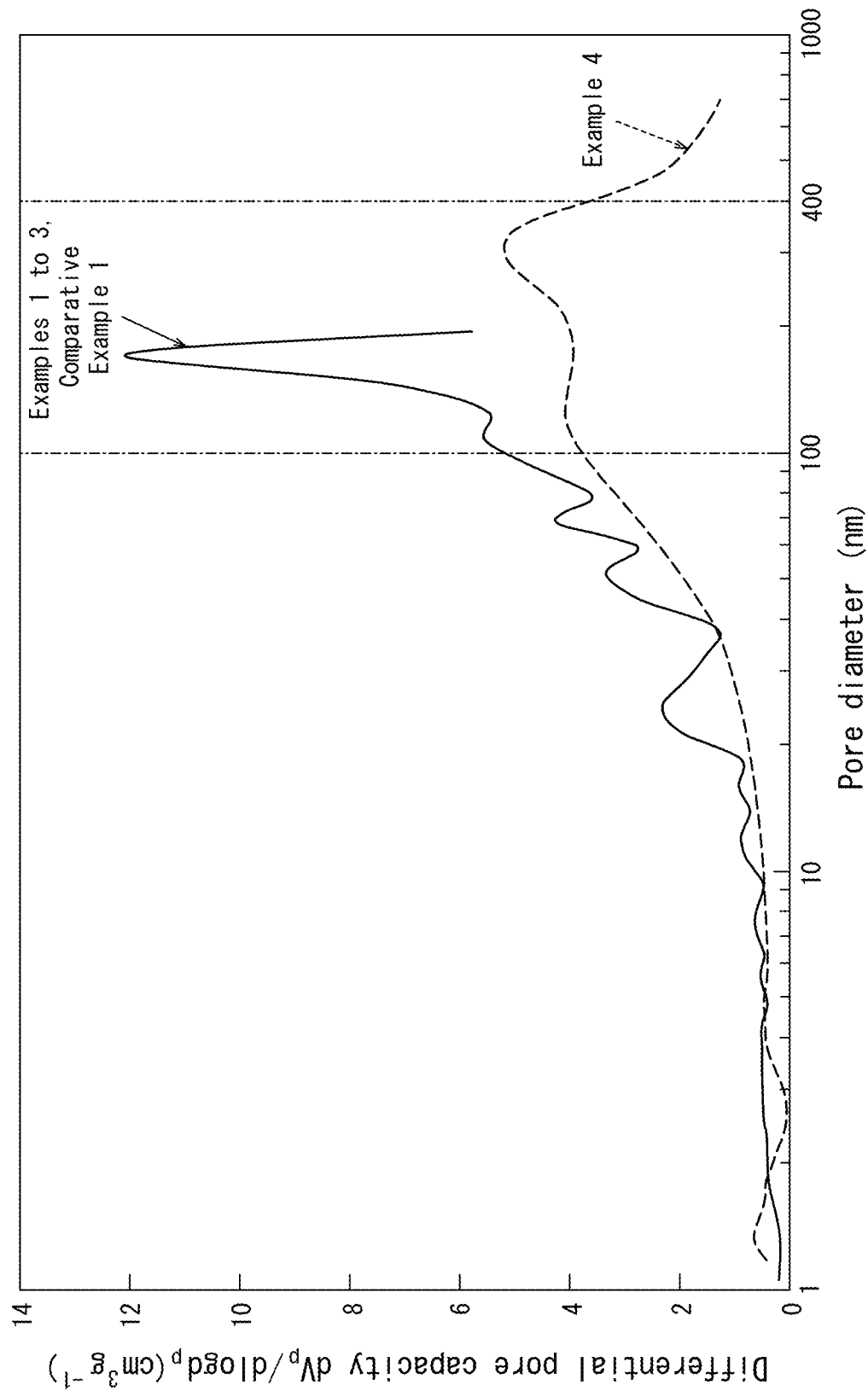
FIG. 6 Pore distribution curves of CNT assemblies according to one example is depicted.

Using 10 mg or more of CNT assemblies, the adsorption isotherm was obtained using liquid nitrogen at 77 K using BELSORP-mini II (manufactured by MicrotracBEL Corp.) (the adsorption equilibration time was set to 500 seconds). Pretreatment was carried out by degassing under vacuum at 100° C. for 12 hours. The pore distribution curve of each sample was obtained from the adsorption amount on the adsorption isotherm by the BJH method. The results are depicted in FIG. 6. As depicted in FIG. 6, it was confirmed that the CNT assemblies had the maximum peak of the Log differential pore capacity in the pore size region of 100 nm or more.

Note that the measurement range of pore sizes was 1 nm or more and less than 400 nm upon preparation of the pore distribution curve of the CNT assemblies.

<Preparation of Pore Distribution Curve Based on Mercury Intrusion Porosimetry (Carbon Film)>

Test specimens of 100 mg or more were cut from carbon films of Examples 1 to 4 and Comparative Example 1, and were pretreated by drying under vacuum at 200° C. for 3 hours. Next, the pore distribution was determined by mercury intrusion porosimetry using a mercury porosimeter (Autopore 5960 manufactured by Micromeritics) in pore radii of about 0.0018 to 100 μm. The pore size was calculated using the Washburn's equation. The results are depicted in Table 1 and FIG. 2. As depicted in FIGS. 1 and 2, peaks with a log differential pore capacity of 1.0 cm$^3$/g or more were observed in the pore size region of 10 nm or more and 100 μm or less in Examples 1 to 4, while no peak with a log differential pore capacity of 1.0 cm$^3$/g or more was observed in the same pore size range in Comparative Example 1.

<Preparation of Pore Distribution Curve Based on BJH Method (Carbon Film)

A test specimen of 10 mg or more was cut out from the carbon films of Examples 1 and 4 and Comparative Example 1, and the adsorption isotherm was obtained using liquid nitrogen at 77 K using BELSORP-mini II (manufactured by MicrotracBEL Corp.) (the adsorption equilibration time was set to 500 seconds). The test specimen was pretreated by degassing under vacuum at 100° C. for 12 hours. The pore distribution curve of each sample was obtained from the adsorption amount on the adsorption isotherm by the BJH method. The results are depicted in FIG. 3. As depicted in FIG. 3, peaks with a value of the Log differential pore capacity of 2.5 cm$^3$/g or more were observed in the pore size region of 10 nm or more and 100 nm or less in Examples 1 to 4, while no peak with a value of the Log differential pore capacity of 2.5 cm$^3$/g or more was observed in the pore size region of 10 nm or more and 100 nm or less in Comparative Example 1. Instead, a peak with a value of the Log differential pore capacity of less than 2.5 cm$^3$/g was observed in the pore size region of less than 10 nm.

Note that the measurement range of pore sizes was 1 nm or more and less than 400 nm upon preparation of the pore distribution curve of the carbon film.

(Two-Dimensional Spatial Frequency Spectrum Analysis of Electron Microscopic Image)

Figure 7A:
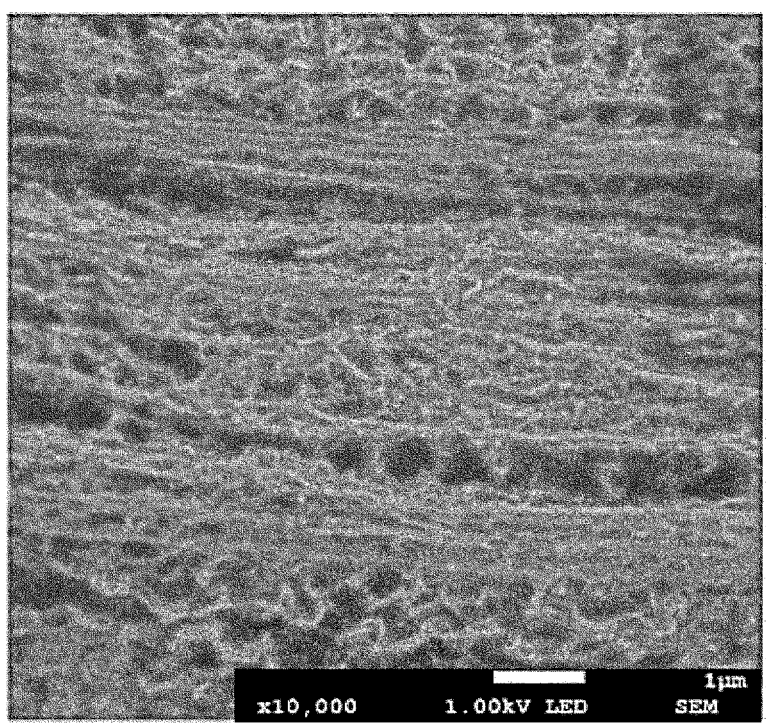
FIG. 7A An SEM image of a CNT assembly according to one example is depicted.
Figure 7B:
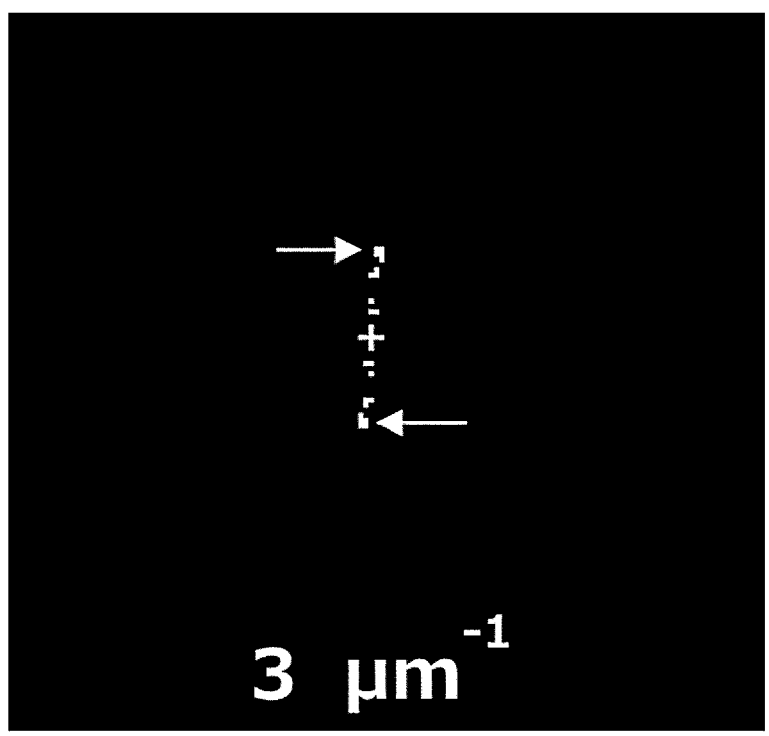
FIG. 7B A two-dimensional spatial frequency spectrum of the image in FIG. 7A is depicted.
Figure 7C:
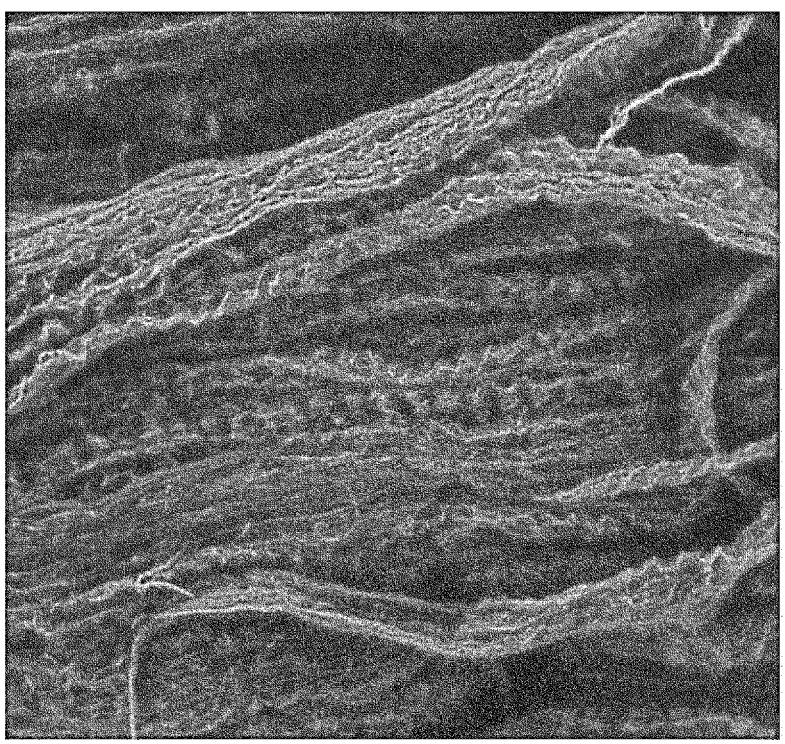
FIG. 7C An SEM image of a CNT assembly according to another example is depicted.
Figure 7D:
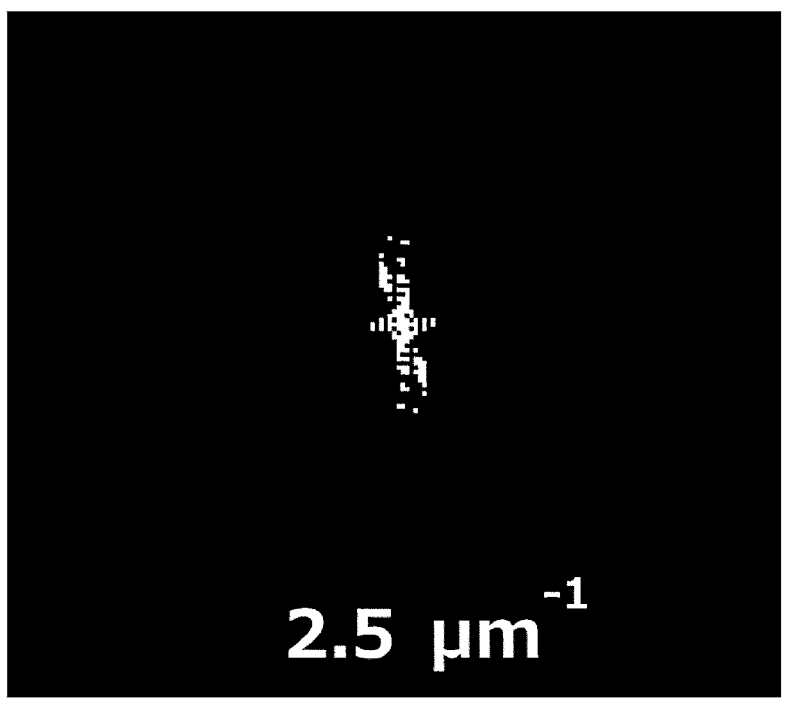
FIG. 7D A two-dimensional spatial frequency spectrum of the image in FIG. 7C is depicted.

On a carbon tape, 0.01 mg of CNT assemblies prepared according to the later-described procedure was placed, and excess CNTs were removed by blowing to prepare a sample. The sample was observed at 10,000× under a field emission scanning electron microscope, and 10 photographs were taken in a field of view of 1 cm square, which was arbitrarily selected. Fast Fourier transform processing was carried out on each of the 10 electron microscopic images to obtain a two-dimensional spatial frequency spectrum. The obtained two-dimensional spatial frequency spectra were binarized, and the outermost peak positions (on the high frequency side) were identified and the average was calculated. In the binarization, when the numerical value obtained through the fast Fourier transform processing was greater than 0.75, 1 was given, or 0 was given otherwise. FIG. 7A is one of the 10 images obtained on the CNT assemblies obtained in Examples 1 to 3 and Comparative Example 1, and FIG. 7B is a two-dimensional spatial frequency spectrum obtained from this image. In FIG. 7B, the components closer to the center are low-frequency components, and the components located outward from the center correspond to higher-frequency components. In the diagram, the arrows indicate the peak positions (3 μm$^{-1}$) with the greatest wave number among the distinct peaks detected in the region of 1 to 100 μm$^{-1}$. Furthermore, FIG. 7C is one of the 10 images obtained on the CNT assembly obtained in Example 4, and FIG. 7D is a two-dimensional spatial frequency spectrum obtained from this image. In FIG. 7D, the components closer to the center are low-frequency components, and the components located outward from the center correspond to higher-frequency components.

<Thickness>

The thickness of a carbon film was measured using a Digimatic Standard Outside Micrometer manufactured by Mitutoyo Corporation.

<Electromagnetic Wave Shielding Performance>

The reflection coefficient S11 and the transmission coefficient S21 of a carbon film were measured by the ASTM method (coaxial structure), and the electromagnetic wave shielding effect [dB] was calculated.

The electromagnetic wave shielding effects [dB] at measurement frequencies of 0.1 MHz, 1 MHz, and 10 MHz were then evaluated according to the following criteria. A greater value of electromagnetic wave shielding effect [dB] at a certain frequency indicates a better electromagnetic wave shielding performance of the carbon film at that frequency.

A: The electromagnetic wave shielding effect was 40 dB or more.
B: The electromagnetic wave shielding effect is 30 dB or more and less than 40 dB.
C: The electromagnetic wave shielding effect was 20 dB or more and less than 30 dB.
D: The electromagnetic wave shielding effect was less than 20 dB.

<Preparation of CNT Assemblies>

Figure 8:
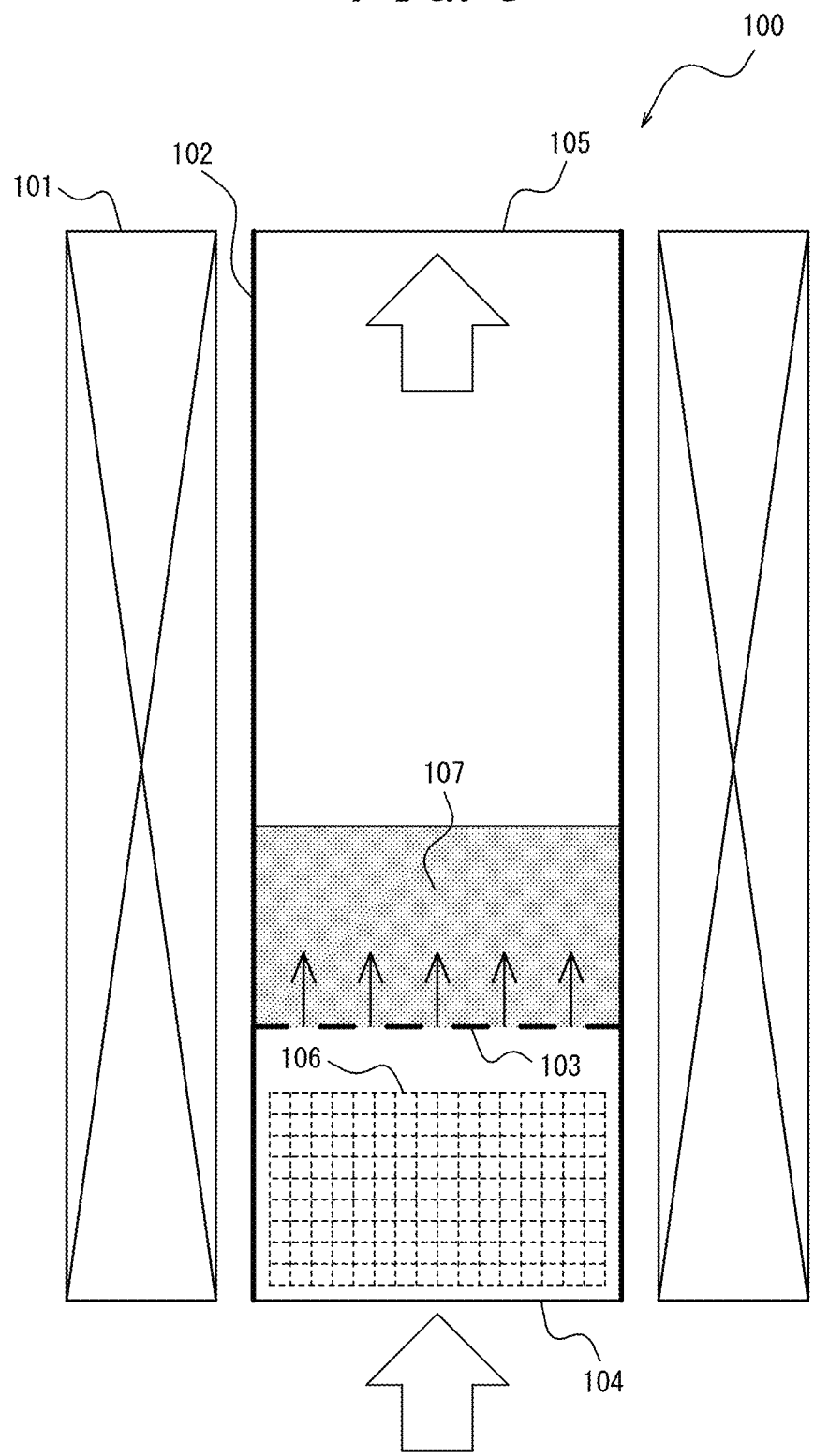
FIG. 8 A schematic diagram of a CNT manufacturing apparatus is depicted.

CNTs used in Examples 1 to 3 and Comparative Example 1 were synthesized as follows The schematic configuration of a CNT manufacturing apparatus used for synthesis is depicted in FIG. 8. The CNT manufacturing apparatus 100 depicted in FIG. 8 includes a heater 101, a reaction tube 102, a dispersion plate 103, a reducing gas/source gas inlet 104, an exhaust vent 105, and a gas heating promoting unit 106. The material of the reaction tube 102 and the dispersion plate 103 was synthetic quartz.

<<Catalyst Carrier Formation Step>>

A catalyst carrier formation step will be described below. Zirconia (zirconium dioxide) beads ($ZrO_2$, volume average particle size D50: 350 μm) as a carrier were charged into a rotary drum type coating apparatus. While the zirconia beads were agitated (20 rpm), a solution containing aluminum was sprayed (spray amount: 3 g/min, spray time: 940 seconds, spray air pressure: 10 MPa) by a spray gun. At the same time, compressed air (300 L/minute) was fed to the rotary drum for drying to form an aluminum-containing film on the zirconia beads. Next, a firing treatment was performed at 480° C. for 45 minutes to prepare primary catalyst particles having an aluminum oxide layer formed thereon. Thereafter, the resultant primary catalyst particles were charged into another rotary drum type coating apparatus. While agitating (at 20 rpm), an iron catalyst solution was sprayed with a spray gun (spray amount: 2 g/min, spray time: 480 seconds, spray air pressure: 5 MPa). At the same time, compressed air (300 L/minute) was fed to the rotary drum for drying to form a coating film containing iron on the primary catalyst particles. Next, a firing treatment was performed at 220° C. for 20 minutes to prepare a catalyst carrier having an iron oxide layer further formed thereon.

<<CNT Synthesis Step>>

The reaction tube 102 of the CNT manufacturing apparatus 100 was charged with 300 g of the thus-prepared catalyst carrier. While the catalyst carrier 107 was fluidized by flowing the gases, the formation step, the growth step, and the cooling step were carried out in this order to thereby produce CNT assemblies. Note that the conditions for each step included in the CNT synthesis step were set as follows.

[Formation Step]
 Setting temperature: 800° C.
 Reducing gases: 3 sLm of nitrogen and 22 sLm of hydrogen
 Process time: 25 minutes

[Growth Step]
 Setting temperature: 800° C.
 Source gases: 15 sLm of nitrogen, 5 sLm of ethylene, 2 sLm of carbon dioxide, and 3 sLm of hydrogen
 Process time: 10 minutes
 Thermal decomposition time of source gases: 0.65 seconds

[Cooling Step]
 Cooling temperature: room temperature
 Purge gas: 25 sLm of nitrogen The CNT assemblies synthesized on the catalyst carrier were separated and recovered using a forced vortex classifier (revolution speed: 3500 rpm, air flow rate: 3.5 Nm$^3$/minute). The recovery rate of the CNT assemblies was 99%.

The properties of the CNT assemblies produced in this example were as follows: tap bulk density: 0.01 g/cm$^3$, average height of CNTs: 200 μm, BET specific surface area: 800 m$^2$/g, average outer diameter: 4.0 nm, and carbon purity: 99%.

Example 1

A CNT dispersion liquid was obtained by adding 1000 g of water to 1 g of the CNT assemblies obtained as described above, which was stirred for 10 minutes at a rotation speed of 3000 rpm in an ultra high speed emulsification-dispersion apparatus (product name: "LABOLUTION® (registered trademark in Japan, other countries, or both)", manufactured by THINKY CORPORATION).

The resulting CNT dispersion was applied on a substrate. The applied film on the substrate was vacuum dried at a temperature of 80° C. for 24 hours to form a carbon film on the substrate. The carbon film was then peeled off from the substrate to obtain a carbon film (free-standing film) having a thickness of 100 μm. The electromagnetic wave shielding performance of the obtained carbon film was evaluated. The results are summarized in Table 1.

Example 2

To prepare the CNT dispersion, an ultrasonic dispersion machine (tabletop ultrasonic cleaner manufactured by Bransonic) was used for dispersion treatment for 10 minutes. A carbon film (free-standing film) having a thickness of 100 μm was obtained in the same way as in Example 1 except for the above. The electromagnetic wave shielding performance of the obtained carbon film was evaluated. The results are summarized in Table 1.

Example 3

To prepare the CNT dispersion, a jet mill (Nanovater, manufactured by Yoshida Kikai Co., Ltd.) was used for dispersion treatment for 15 minutes under a condition of 100 MPa. A carbon film (free-standing film) having a thickness of 100 μm was obtained in the same way as in Example 1 except for the above. The electromagnetic wave shielding performance of the obtained carbon film was evaluated. The results are summarized in Table 1.

Example 4

<Preparation of CNT Assemblies>

CNT assemblies used in Example 4 were prepared by feeding source gas to the CNT synthesis step while continuously conveying the particulate catalyst support by screw rotations.

Figure 9:
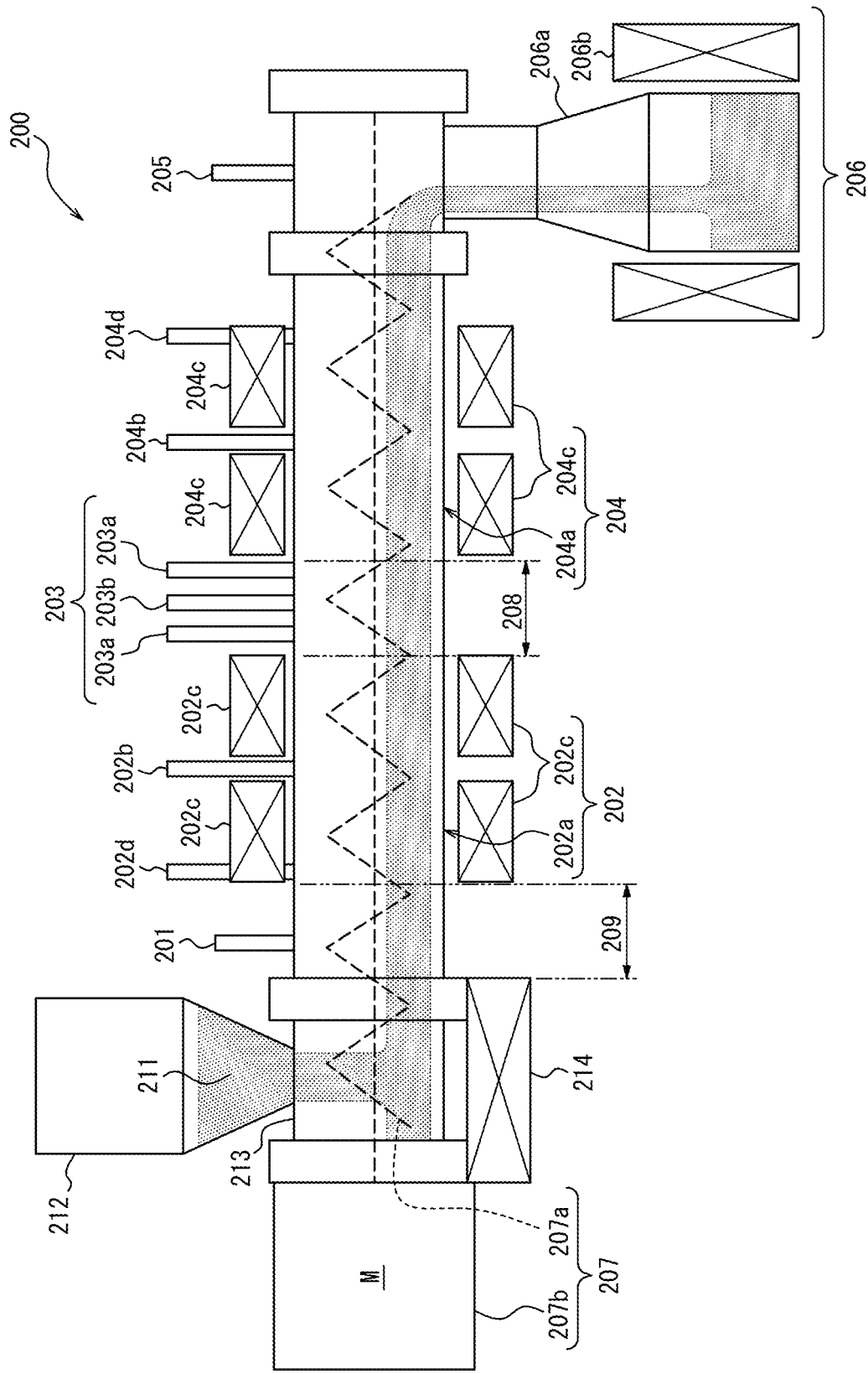
FIG. 9 A schematic configuration of a CNT manufacturing apparatus used in Example 4 is depicted.

The schematic configuration of the CNT assembly manufacturing apparatus 200 used is depicted in FIG. 9. The CNT assembly manufacturing apparatus 200 illustrated in FIG. 9 includes a formation unit 202, a growth unit 204, a conveyance unit 207 that conveys a substrate while the substrate passes from the formation unit 202 to the growth unit 204, a connection portion 208 that spatially connects the formation unit 202 and the growth unit 204 to each other, and a gas mixing prevention device 203 that prevents the gas of the formation unit 202 and the gas of the growth unit 204 from mixing with each other. Further, the CNT assembly manufacturing apparatus 200 includes components such as an inlet purge device 202 disposed at the front stage of the formation unit 201, an outlet purge device 204 disposed at the rear stage of the growth unit 205, and a cooling unit 205 disposed at the rear stage of the outlet purge device 206. The formation unit 202 is configured from a formation furnace 202a for retaining the reducing gas, a reducing gas ejection device 202b for injecting the reducing gas, a heating device 202c for heating at least one of the catalyst and the reducing gas, an vent device 202d for venting the gases inside the furnace out of the system, and the like. The gas mixing prevention device 203 includes an vent device 203a and a purge gas ejection device 203b for ejecting purge gas (sealing gas). The growth unit 204 includes a growth furnace 304a for maintaining the source gas environment, a source gas ejection device 304b for injecting the source gas, a heating device 304c for heating at least one of the catalyst and the source gas, an vent device 304d for venting the gases inside the furnace out of the system, and the like. The inlet purge device 201 is attached to a connection section 209 that connects a front chamber 213 which is a component for introducing the substrate into the system via a hopper 212 and a formation furnace 202a. The cooling unit 206 includes a cooling vessel 206a for retaining an inert gas, and a water-cooled cooling device 206b disposed so as to surround the internal space of the cooling vessel 206a. The conveyance unit 207 is a unit for continuously conveying the substrate 211 by screw rotations. This is achieved by a screw vane 207a and a driving device 207b that can rotate the screw vane to provide the substrate conveying capability. A heating device 214 is configured to be capable of heating the system at a temperature lower than the heating temperature in the formation unit so as to heat the vicinity of the driving device 207B.

<Catalyst Layer Formation Step>

Zirconia (zirconium dioxide) beads ($ZrO_2$, volume average particle size D50: 650 μm) as a substrate were charged into a rotary drum type coating apparatus. While the zirconia beads were agitated (20 rpm), a solution containing aluminum was sprayed (spray amount: 3 g/min, spray time: 940 seconds, spray air pressure: 10 MPa) by a spray gun. At the same time, compressed air (300 L/minute) was fed to the rotary drum for drying to form an aluminum-containing film on the zirconia beads. Next, a firing treatment was performed at 480° C. for 45 minutes to prepare primary catalyst particles having an aluminum oxide layer formed thereon. Thereafter, the resultant primary catalyst particles were charged into another rotary drum type coating apparatus. While agitating (at 20 rpm), an iron catalyst solution was sprayed with a spray gun (spray amount: 2 g/min, spray time: 480 seconds, spray air pressure: 5 MPa). At the same time, compressed air (300 L/minute) was fed to the rotary drum for drying to form a coating film containing iron on the primary catalyst particles. Next, a firing treatment was performed at 220° C. for 20 minutes to prepare a substrate having an iron oxide layer further formed thereon.

<<Synthesis of CNT>>

The substrate having the catalyst on the surface thereof produced as described above was charged into a feeder hopper of the manufacturing apparatus, and the substrate was processed in the order of the formation step, the growth step, and the cooling step while the substrate was conveyed by a screw conveyor to produce CNT assemblies.

<Formation Step to Cooling Step>

Each condition of the inlet purge device, the formation unit, the gas mixing prevention device, the growth unit, the outlet purge device, and the cooling unit of the CNT assembly manufacturing apparatus was set as follows.

Feeder Hopper
  Feed rate: 1.25 kg/h
  Exhaust volume: 10 sLm (spontaneous exhaust from the opening)
Inlet Purge Device
  Purge gas: 40 sLm of nitrogen
Formation Unit
  Furnace internal temperature: 800° C.
  Reducing gases: 6 sLm of nitrogen and 54 sLm of hydrogen
  Exhaust volume: 60 sLm
  Process time: 20 minutes
Gas Mixing Prevention Device
  Purge gas: 20 sLm
  Exhaust volume of vent device: 62 sLm
Growth Unit
  Furnace internal temperature: 830° C.
  Source gases: 15 sLm of nitrogen, 5 sLm of ethylene, 1 sLm of carbon dioxide, and 3 sLm of hydrogen
  Exhaust volume: 47 sLm
  Process time: 10 minutes
Outlet Purge Device
  Purge gas: 45 sLm of nitrogen
Cooling Unit
  Cooling temperature: room temperature
  Exhaust volume: 10 sLm (spontaneous exhaust from the opening) Continuous production was carried out under the above conditions.

<Separation and Recovery Step>

The CNT assemblies synthesized on the substrate were separated and recovered using a forced vortex classifier (revolution speed: 2300 rpm, air flow rate: 3.5 Nm³/minute). The recovery rate of the CNT assemblies was 96%.

The properties of the CNT assemblies produced in this example as typical values were as follows: tap bulk density: 0.02 g/cm³, average length of CNTs: 150 μm, BET-specific surface area: 900 m²/g, average outer diameter: 4.0 nm, and carbon purity: 99%.

A CNT dispersion liquid was obtained by adding 1000 g of water to 1 g of the CNT assemblies obtained as described above, which was stirred for 10 minutes at a rotation speed of 3000 rpm in an ultra high speed emulsification-dispersion apparatus (product name: "LABOLUTION®", manufactured by THINKY CORPORATION).

The resulting CNT dispersion was applied on a substrate. The applied film on the substrate was vacuum dried at a temperature of 80° C. for 24 hours to form a carbon film on the substrate. The carbon film was then peeled off from the substrate to obtain a carbon film (free-standing film) having a thickness of 100 μm. The electromagnetic wave shielding performance of the obtained carbon film was evaluated The results are summarized in Table 1.

Comparative Example 1

To prepare the CNT dispersion, 1 g of sodium dodecyl sulfate was added as a dispersing agent, which was dispersed using a jet mill (Nanovater, manufactured by Yoshida Kikai Co., Ltd.) for 15 minutes under a condition of 100 MPa. A carbon film (free-standing film) having a thickness of 100 μm was obtained in the same way as in Example 1 except for the above. The electromagnetic wave shielding performance of the obtained carbon film was evaluated. The results are summarized in Table 1.

From Table 1, it is understood that carbon films with at least one peak with a log differential pore capacity of 1.0 cm³/g or more within a pore size range of 10 nm or more and 100 μm or less in the pore distribution curve obtained based on the mercury intrusion porosimetry can exhibit an excellent electromagnetic wave shielding performance across a wide frequency range.

INDUSTRIAL APPLICABILITY

According to the present disclosure, it is possible to provide a carbon film having an excellent electromagnetic wave shielding performance.

REFERENCE SIGNS LIST

100 CNT manufacturing apparatus
101 Heater
102 Reaction tube
103 Dispersion plate
104 Reducing gas/source gas inlet
105 Exhaust vent
106 Gas heating promotion section
107 Catalyst carrier
200 CNT assembly manufacturing apparatus
201 Inlet purge device
202 Formation unit
202a Formation furnace
202b Reducing gas ejection device
202c Heating device
202d Vent device
203 Gas mixing prevention device
203a Vent device
203b Purge gas ejection device
204 Growth unit
204a Growth furnace

TABLE 1

| | | | Example 1 | Example 2 | Example 3 | Example 4 | Comparative Example 1 |
|---|---|---|---|---|---|---|---|
| CNT assemblies | Condition (1) | FIR resonance peak [cm⁻¹] | | 830 | | 685 | 830 |
| | | Plasmonic effective length [nm] | | 57 | | 69 | 57 |
| | | ISO circular mean of dispersion [μm] | | 238 | | 67 | 238 |
| | Condition (2) | Presence or absence of peak in pore size of 100 to 400 nm | Y | | | Y | Y |
| | Condition (3) | Peak position of spatial frequency spectun [μm⁻¹] and presence of peak at 1 to 100 μm⁻¹ | Y (3 μm⁻¹) | | | Y (2.5 μm⁻¹) | Y (3 μm⁻¹) |
| Method of producing dispersion liquid | | Apparatus used | Labolution | Ultrasonic disperser | Jet mill | Labolution | Jet mill |
| | | Dispersion means | Stirring vane | Ultrasonic | Shear | Stirring vane | Shear |
| | | Dispersion time [min] | 10 | 10 | 15 | 10 | 15 |
| | | Dispersing agent | None | None | None | None | Dodecylsulfate Na |
| Carbon film | Pore distribution curve by mercury intrusion porosimetry | Number of peaks (≥1.0 cm³/g) | 3 | 2 | 1 | 2 | 0 |
| | | ①Peak position [nm] | 8225 | 654 | 138 | 183 | 16 |
| | | ①Log differential pore volume | 22 | 2.9 | 1.8 | 1.9 | 0.7 |
| | | ②Peak position [nm] | 60 | 3558 | — | 2057 | — |
| | | ②Log differential pore volume | 1.4 | 1.1 | — | 4.9 | — |
| | | ③Peak position [nm] | 35580 | — | — | — | — |
| | | ③Log differential pore volume | 9.1 | — | — | — | — |
| | Pore distribution curve by BJH method | Number of peaks (≥2.5 cm³/g) | 1 | 1 | 2 | 1 | 0 |
| | | ① Peak position [nm] | 33 | 19 | 52 | 28 | 4 |
| | | ① Log differential pore volume | 4 | 3.7 | 4.1 | 3.5 | 2 |
| | | ② Peak position [nm] | — | — | 28 | — | — |
| | | ② Log differential pore volume | — | — | 3.1 | — | — |
| Evaluation | Electromagnetic wave shielding characteristic | 0.1 MHz | B | B | C | B | D |
| | | 1 MHz | B | B | B | B | D |
| | | 10 MHz | A | B | B | A | D |

204b Source gas ejection device
204c Heating device
204d Vent device
205 Outlet purge device
206 Cooling unit
206a Cooling vessel
206b Water-cooled cooling device
207 Conveyance unit
207a Screw vane
207b Driving device
208-210 Connection section
211 Substrate
212 Hopper
214 Heating device

The invention claimed is:

1. A carbon film formed from carbon nanotube assemblies,
   wherein a pore distribution curve indicating a relationship between a pore size and a Log differential pore capacity obtained based on mercury intrusion porosimetry has at least one peak with a log differential pore capacity of 1.0 $cm^3/g$ or more within a pore size range of 10 nm or more and 100 μm or less.

2. The carbon film according to claim 1, being a free-standing film.

3. The carbon film according to claim 1, wherein the pore distribution curve indicating the relationship between the pore size and the Log differential pore capacity obtained based on the mercury intrusion porosimetry has at least one peak with a log differential pore capacity of 10.0 $cm^3/g$ or more within a pore size range of 2000 nm or more and 20 μm or less.

4. The carbon film according to claim 1,
   wherein a pore distribution curve indicating the relationship between the pore size and the Log differential pore capacity obtained from an adsorption isotherm of liquid nitrogen at 77 K based on the Barrett-Joyner-Halenda method has at least one peak with a log differential pore capacity of 2.5 $cm^3/g$ or more within a pore size range of 10 nm or more and 100 nm or less.

5. The carbon film according to claim 1, wherein the carbon nanotube assemblies satisfy at least one of the following conditions (1) to (3):
   (1) a spectrum obtained by a Fourier transform infrared spectroscopic analysis on a carbon nanotube dispersion obtained by dispersing the carbon nanotube assemblies so that a bundle length is 10 μm or more, has at least one peak based on plasmon resonance of the carbon nanotube dispersion in a wavenumber range of more than 300 $cm^{-1}$ and 2000 $cm^{-1}$ or less;
   (2) a maximum peak of the pore distribution curve indicating the relationship between the pore size and the Log differential pore capacity of the carbon nanotube assemblies obtained from the adsorption isotherm at 77 K of liquid nitrogen based on the Barrett-Joyner-Halenda method is in a pore size range of more than 100 nm and less than 400 nm; and
   (3) a two-dimensional spatial frequency spectrum of an electron microscopic image of the carbon nanotube assemblies has at least one peak within a range of 1 $μm^{-1}$ or more and 100 $μm^{-1}$ or less.

* * * * *